United States Patent
Gotoh et al.

(10) Patent No.: US 9,976,084 B2
(45) Date of Patent: May 22, 2018

(54) LIQUID CRYSTAL COMPOSITION, ANTIOXIDANT AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Yasuyuki Gotoh, Tokyo (JP); Ryushi Shundo, Chiba (JP); Norikatsu Hattori, Chiba (JP)

(73) Assignees: JNC CORPORATION, Tokyo (JP); JNC PETROCHEMICAL CORPORATION, Tokyo (JP)

(*) Notice: Subject to any disclaimer, the term of this patent is extended or adjusted under 35 U.S.C. 154(b) by 161 days.

(21) Appl. No.: 14/140,568

(22) Filed: Dec. 26, 2013

(65) Prior Publication Data

US 2014/0183409 A1 Jul. 3, 2014

(30) Foreign Application Priority Data

Dec. 27, 2012 (JP) .................................. 2012-284524

(51) Int. Cl.
*C09K 19/54* (2006.01)
(52) U.S. Cl.
CPC .................................. *C09K 19/54* (2013.01)
(58) Field of Classification Search
None
See application file for complete search history.

(56) References Cited

U.S. PATENT DOCUMENTS

2006/0016752 A1  1/2006  Hai et al.
2011/0140039 A1* 6/2011  Wu ..................... C09K 19/3098
                                                    252/299.61
2012/0190897 A1* 7/2012  Yamashita et al. ........... 568/645

FOREIGN PATENT DOCUMENTS

JP    2002-256267    9/2002
JP    2008-507580    3/2008
JP    2010-180266    8/2010

OTHER PUBLICATIONS

Castle et al. "Inhibition Kinetics of Chain-Breaking Phenolic Antioxidants in SDS Micelles", Oct. 1, 1986, Journal of American Chemical Society, 108, 6381-6382.*
Shitara et al., Synthesis of Optically Active 2-Methylchroman Derivatives and Application to Chiral Dopants for Nematic Liquid Crystals, 2000, Bulletin of the Chemical Society of Japan, vol. 73, 259-265.*
Scott et al., "6-Hydroxychroman-2-carboxylic acids: Novel Antioxidants", 1974, Journal of the American Oil Chemists Society, vol. 51, Issue 5, 200-203.*
English Translation of JP2010180266.*

* cited by examiner

*Primary Examiner* — Mark F. Huff
*Assistant Examiner* — Anna Malloy
(74) *Attorney, Agent, or Firm* — JCIPRNET

(57) ABSTRACT

A liquid crystal composition including an antioxidant, and a liquid crystal display device containing this composition are described. The liquid crystal composition has a nematic phase, has a high solubility in a liquid crystal composition, and includes a specific antioxidant useful for preventing deterioration of the composition. The liquid crystal composition may also include a specific compound having a high maximum temperature or a small viscosity as a first component, a specific compound having a high maximum temperature or a large dielectric anisotropy as a second component, and a specific compound having a large negative dielectric anisotropy as a third component.

15 Claims, No Drawings

LIQUID CRYSTAL COMPOSITION, ANTIOXIDANT AND LIQUID CRYSTAL DISPLAY DEVICE

CROSS-REFERENCE TO RELATED APPLICATION

This application claims the priority benefit of Japan Application serial No. 2012-284524, filed on Dec. 27, 2012. The entirety of the above-mentioned patent application is hereby incorporated by reference herein and made a part of this specification.

TECHNICAL FIELD

The invention relates to a liquid crystal composition, a liquid crystal display device containing this composition, and so forth, and also relates to a liquid crystal composition containing an antioxidant, an active matrix (AM) device containing this composition, and so forth.

TECHNICAL BACKGROUND

For liquid crystal display devices, the classification based on the operating mode of liquid crystal molecules includes modes such as phase change (PC), twisted nematic (TN), super twisted nematic (STN), electrically controlled birefringence (ECB), optically compensated bend (OCB), in-plane switching (IPS), vertical alignment (VA), fringe field switching (FFS), polymer sustained alignment (PSA) and field induced photo-reactive alignment (FPA). The classification based on the driving mode of the device includes passive matrix (PM) type and active matrix (AM) type. The PM type is classified into static type, multiplex type and so forth, and the AM type is classified into thin film transistor (TFT) type, metal-insulator-metal (MIM) type and so forth. The TFT type is further classified into amorphous silicon type and polycrystal silicon type. The latter is classified into high temperature type and low temperature type according to the production process. The classification based on the light source includes the reflection type utilizing natural light, the transmission type utilizing a backlight, and the semi-transmission type utilizing both natural light and a backlight.

These devices contain a liquid crystal composition having suitable characteristics. This liquid crystal composition has a nematic phase. General characteristics of the composition should be improved to give an AM device having good general characteristics. Table 1 below summarizes the relationship between these two groups of general characteristics. The general characteristics of the composition will be further explained on the basis of a commercially available AM device. The temperature range of the nematic phase relates to the temperature range in which the device can be used. The desirable maximum temperature of the nematic phase is about 70° C. or higher, and the desirable minimum temperature of the nematic phase is about −10° C. or lower. The viscosity of the composition relates to the response time of the device. A short response time is desirable for displaying moving images on the device. Accordingly, a small viscosity of the composition is desirable. A small viscosity at a low temperature is more desirable.

TABLE 1

General Characteristics of Composition and AM Device

| No. | General Characteristics of Composition | General Characteristics of AM Device |
|---|---|---|
| 1 | wide temperature range of nematic phase | wide temperature range in which device can be used |
| 2 | small viscosity [1] | short response time |
| 3 | suitable optical anisotropy | large contrast ratio |
| 4 | large positive or negative dielectric anisotrophy | low threshold voltage and small electric power consumption large contrast ratio |
| 5 | large specific resistance | large voltage holding ratio and large contrast ratio |
| 6 | high stability to ultraviolet light and heat | long service life |
| 7 | large elastic constant | large contrast ratio and short response time |

[1] A composition can be injected into a liquid crystal display device in a shorter period of time.

The optical anisotropy of the composition relates to the contrast ratio of the device. The product (Δn×d) of the optical anisotropy (Δn) of the composition and the cell gap (d) of the device is designed so as to maximize the contrast ratio. The suitable value of the product depends on the kind of operating mode. The suitable value is about 0.45 μm in a device having a mode such as TN. In a device having a VA mode, the suitable value is in the range of about 0.30 μm to about 0.40 μm. In a device having an IPS mode or an FFS mode, the suitable value is in the range of about 0.20 μm to about 0.30 μm. In this case, a composition having a large optical anisotropy is desirable for a device having a small cell gap. A large positive or negative dielectric anisotropy of the composition contributes to a low threshold voltage, small electric power consumption and a large contrast ratio of the device. Accordingly, a large positive or negative dielectric anisotropy is desirable.

A large specific resistance of the composition contributes to a large voltage holding ratio and a large contrast ratio of the device. Accordingly, it is desirable that a composition should have a large specific resistance at room temperature and also at a temperature close to the maximum temperature of nematic phase in the initial stage. It is desirable that a composition should have a large specific resistance at room temperature also at a temperature close to the maximum temperature of nematic phase after being used for a long time. The stability of the composition to UV light and heat relates to the service life of the device. When the stability is high, the device has a long service life. A large elastic constant of the composition contributes to a large contrast ratio and a short response time. Accordingly, a large elastic constant is desirable. Such characteristics are desirable for an AM device used in a liquid crystal projector, a liquid crystal television and so on.

A composition having positive dielectric anisotropy is used for an AM device having a TN mode. In contrast, a composition having negative dielectric anisotropy is used for an AM device having a VA mode. A composition having positive or negative dielectric anisotropy is used for an AM device having an IPS mode or an FFS mode. A composition having positive or negative dielectric anisotropy is used for an AM device having a PSA mode or an FPA mode.

A composition tends to deteriorate due to oxidation when the liquid crystal display device is used for a long time. Hence, an antioxidant such as 2,6-di-tert-butyl-4-methyl-phenol (BHT) is sometimes added to prevent oxidation of the composition (Patent Documents No. 1 and No. 2). A more useful antioxidant is expected in view of the solubility in a composition for instance.

PRIOR ART

Patent Documents

Patent Document No. 1: JP 2002-256267 A.
Patent Document No. 2: JP 2010-180266 A.
Patent Document No. 3: JP 2008-507580 A.

A desirable AM device has characteristics such as a wide temperature range in which the device can be used, a short response time, a large contrast ratio, a low threshold voltage, a large voltage holding ratio and a long service life. Response time that is even one millisecond shorter than that of the other devices is desirable. Thus, desirable characteristics of the composition include a high maximum temperature of a nematic phase, a low minimum temperature of a nematic phase, a small viscosity, a suitable optical anisotropy, a large positive or negative dielectric anisotropy, a large specific resistance, a high stability to UV light, a high stability to heat and a large elastic constant, etc.

SUMMARY OF THE INVENTION

Accordingly, the invention provides a liquid crystal composition that includes an antioxidant and satisfies at least one of characteristics such as a high maximum temperature of a nematic phase, a low minimum temperature of a nematic phase, a small viscosity, a suitable optical anisotropy, a large positive or negative dielectric anisotropy, a large specific resistance, a high stability to UV light, a high stability to heat and a large elastic constant. The invention also provides a liquid crystal composition that is suitably balanced between at least two of the characteristics. The invention further provides a liquid crystal composition that has characteristics such as a high maximum temperature, a high stability to UV light and a high stability to heat. The invention further provides a liquid crystal display device containing such a composition. The invention further provides an AM device that has characteristics such as a short response time, a large voltage holding ratio, a low threshold voltage, a large contrast ratio and a long service life. The invention further provides a compound that has a high solubility in a liquid crystal composition and is useful in preventing deterioration of a composition.

The liquid crystal composition includes at least one compound selected from the group of compounds represented by formula (1) as an additive, and has a nematic phase. The liquid crystal display device contains this composition.

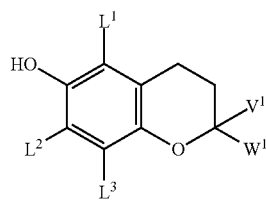

(1)

In formula (1), $L^1$, $L^2$, $L^3$ and $W^1$ are independently hydrogen, halogen, —COOH or alkyl having 1 to 10 carbons, and in the alkyl, at least one —CH$_2$— may be replaced by —O— or —S—, at least one —CH$_2$—CH$_2$— may be replaced by —CH=CH—, and at least one hydrogen may be replaced by halogen; and $V^1$ is alkyl having 1 to 30 carbons, and in the alkyl, at least one —CH$_2$— may be replaced by —O—, —CO—, —COO—, —OCO—, —OCOO— or —NH—, at least one —CH$_2$CH$_2$— may be replaced by —CH=CH— or —C≡C—, at least one —CH$_3$ may be replaced by —OH, —SH, —C≡N, —COOH, —NO$_2$ or —NH$_2$, and at least one hydrogen may be replaced by halogen.

With the invention, there is provided a liquid crystal composition that includes an antioxidant and satisfies at least one of characteristics such as a high maximum temperature of a nematic phase, a low minimum temperature of a nematic phase, a small viscosity, a suitable optical anisotropy, a large positive or negative dielectric anisotropy, a large specific resistance, a high stability to UV light, a high stability to heat and a large elastic constant. There is also provided a liquid crystal composition that is suitably balanced between at least two of the characteristics. There is further provided a liquid crystal display device containing such a composition. There is further provided a liquid crystal composition that has characteristics such as a high maximum temperature, a high stability to UV light and a high stability to heat. There is further provided an AM device that has characteristics such as a short response time, a large voltage holding ratio, a low threshold voltage, a large contrast ratio and a long service life. There is additionally provided a compound that has a high solubility in a liquid crystal composition and is useful in preventing deterioration of a composition.

Embodiments of the Invention

Usage of the terms in this specification is described as follows. A liquid crystal composition and a liquid crystal display device are sometimes abbreviated to "a composition" and "a device," respectively. A liquid crystal display device is a generic term for a liquid crystal display panel and a liquid crystal display module. "A liquid crystal compound" is a generic term for a compound having a liquid crystal phase such as a nematic phase or a smectic phase, and a compound having no liquid crystal phases but being added for the purpose of adjusting characteristics of a composition such as maximum temperature, minimum temperature, viscosity and dielectric anisotropy. This compound has a six-membered ring such as 1,4-cyclohexylene or 1,4-phenylene, and the molecular structure is rod-like. A liquid crystal composition is prepared by mixing such liquid crystal compounds. The proportion (content) of a liquid crystal compound is expressed as a percentage by weight (wt %) based on the weight of this liquid crystal composition. An additive such as a polymerizable compound, a polymerization initiator, a polymerization inhibitor, an optically active compound, an antioxidant, a UV light absorbent, a light stabilizer, a thermal stabilizer, an antifoaming agent or a pigment is added to this composition as required. The proportion (addition amount) of the additive is expressed as a weight percentage (wt %) based on the weight of the liquid crystal composition as in the case of the liquid crystal compound. The unit of weight part per million (ppm) is sometimes used. However, the proportion of a polymerization initiator or a polymerization inhibitor is expressed based on the weight of a polymerizable compound. When the weight of a liquid crystal composition including an additive is the standard, the expression "based on the total weight of the liquid crystal composition" is used.

The higher limit of the temperature range of a nematic phase is sometimes abbreviated to "the maximum temperature." The lower limit of the temperature range of a nematic phase is sometimes abbreviated to "the minimum temperature." That "specific resistance is large" means that a composition has a large specific resistance at room temperature and also at a temperature close to the maximum temperature of a nematic phase in the initial stage, and that the composition has a large specific resistance at room temperature and also at a temperature close to the maximum temperature of a nematic phase even after it has been used for a long time. That "voltage holding ratio is large" means that a device has a large voltage holding ratio at room temperature and also at a temperature close to the maximum temperature of a nematic phase in the initial stage, and that the device has a large voltage holding ratio at room temperature and also at a temperature close to the maximum temperature of a nematic phase even after it has been used for a long time. The expression "increase the dielectric anisotropy" means that its value increases positively when the composition has positive dielectric anisotropy, and that its value increases negatively when the composition has negative dielectric anisotropy.

The symbol $R^1$ for the terminal group $R^1$ is used for a plurality of compounds in the chemical formulas of the component compounds. In these compounds, two groups represented by arbitrary two $R^1$ may be the same or different. In a case, for example, $R^1$ of compound (2-1) is ethyl and $R^1$ of compound (2-2) is ethyl. In another case, $R^1$ of compound (2-1) is ethyl and $R^1$ of compound (2-1) is propyl. The same rule applies to the symbols of groups such as other terminal groups and lateral groups. In formula (2), two rings A are present when n is 2. In this compound, two groups represented by the two rings A may be the same or different. The same rule applies to arbitrary two rings A even when n is greater than 2. The same rule also applies to the symbols of the groups such as other rings and bonding groups.

The expression "at least one 'A' may be replaced by 'B'" means that the position of 'A' is arbitrary when the number of 'A' is one, and the positions can also be selected without restriction when the number of 'A' is two or more. For example, the expression "in the alkyl, at least one —$CH_2$— may be replaced by —O— or —S—" includes groups such as —$OCH_3$, —$CH_2OCH_3$, —$CH_2OCH_2CH_2OCH_3$, —$SCH_2CH_2CH_3$, —$CH_2CH_2SCH_3$ and —$CH_2OCH_2CH_2SCH_3$.

2-Fluoro-1,4-phenylene means the two divalent rings described below. The fluorine may face left (L) or right (R) in a chemical formula. The same rule applies to other asymmetric divalent rings such as tetrahydropyran-2,5-diyl.

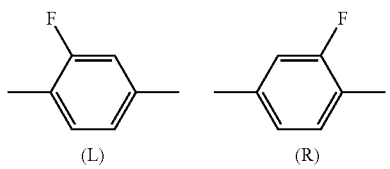

The invention includes the following items.

1. A liquid crystal composition having a nematic phase and including at least one compound selected from the group of compounds represented by formula (1) as an additive:

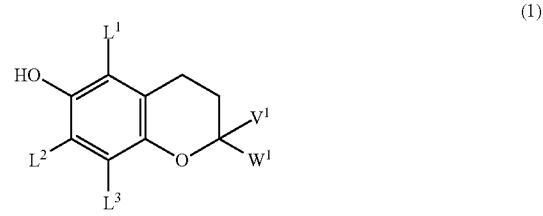

in formula (1), $L^1$, $L^2$, $L^3$ and $W^1$ are independently hydrogen, halogen, —COOH or alkyl having 1 to 10 carbons, and in the alkyl, at least one —$CH_2$— may be replaced by —O— or —S—, at least one —$CH_2$—$CH_2$— may be replaced by —CH=CH—, and at least one hydrogen may be replaced by halogen; and $V^1$ is alkyl having 1 to 30 carbons, and in the alkyl, at least one —$CH_2$— may be replaced by —O—, —CO—, —COO—, —OCO—, —OCOO— or —NH—, at least one —$CH_2CH_2$— may be replaced by —CH=CH— or —C≡C—, at least one —$CH_3$ may be replaced by —OH, —SH, —C≡N, —COOH, —$NO_2$ or —$NH_2$, and at least one hydrogen may be replaced by halogen.

2. The liquid crystal composition of item 1, wherein the additive is at least one compound selected from the group of compounds represented by formula (1-1) to formula (1-5):

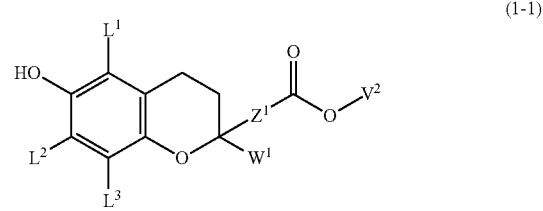

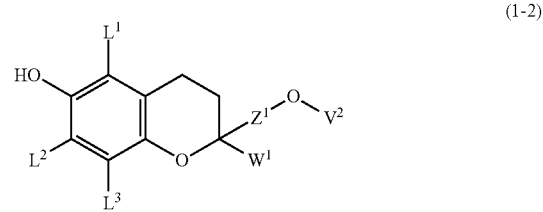

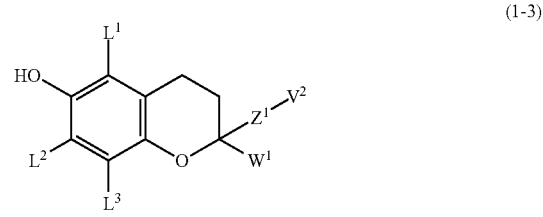

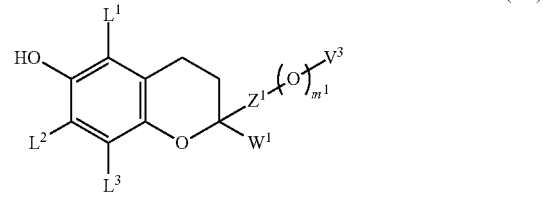

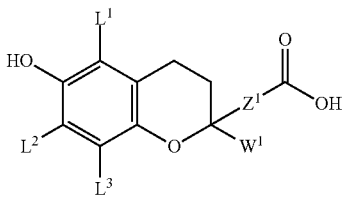
(1-5)

in formula (1-1) to formula (1-5), $L^1$, $L^2$, $L^3$ and $W^1$ are independently hydrogen, fluorine, chlorine, —COOH or alkyl having 1 to 10 carbons, and in the alkyl, at least one —CH$_2$— may be replaced by —O—, at least one —CH$_2$—CH$_2$— may be replaced by —CH=CH—, and at least one hydrogen may be replaced by fluorine or chlorine;

$V^2$ is alkyl having 1 to 20 carbons or alkenyl having 2 to 20 carbons, and in the alkyl or alkenyl, at least one hydrogen may be replaced by fluorine or chlorine;

$V^3$ is —NO$_2$ or —NH$_2$;

$Z^1$ is alkylene having 1 to 5 carbons or a single bond; and $m^1$ is 0 or 1.

3. The liquid crystal composition of item 2, wherein the additive is at least one compound selected from the group of compounds represented by formulas (1-1) to (1-5), wherein $L^1$, $L^2$ and $L^3$ are independently hydrogen, fluorine or —CH$_3$; $W^1$ is hydrogen or alkyl having 1 to 10 carbons; $V^2$ is alkyl having 1 to 20 carbons or alkenyl having 2 to 20 carbons, and in the alkyl or alkenyl, at least one hydrogen may be replaced by fluorine; $V^3$ is —NO$_2$ or —NH$_2$; $Z^1$ is alkylene having 1 to 5 carbons or a single bond; and $m^1$ is 0 or 1.

4. The liquid crystal composition of item 2, wherein the additive is at least one compound selected from the group of compounds represented by formula (1-1), where $L^1$, $L^2$ and $L^3$ is —CH$_3$; $W^1$ is —CH$_3$; $V^2$ is —(CH$_2$)$_j$—CH(CH$_3$)$_2$ (j is an integer of 0 to 17); and $Z^1$ is a single bond.

5. The liquid crystal composition of item 2, wherein the additive is at least one compound selected from the group of compounds represented formula (1-2), where $L^1$, $L^2$ and $L^3$ is —CH$_3$; $W^1$ is —CH$_3$; $V^2$ is alkyl having 1 to 20 carbons or alkenyl having 2 to 20 carbons; and $Z^1$ is a single bond.

6. The liquid crystal composition of any one of items 1 to 5, further including at least one antioxidant that is different from the compound represented by formula (1) of item 1 as an additive.

7. The liquid crystal composition of any one of items 1 to 6, wherein the proportion of the compound represented by formula (1) of item 1 is in the range of 0.005 wt % to 3 wt % based on the weight of the liquid crystal composition.

8. The liquid crystal composition of any one of items 1 to 7, including at least one compound selected from the group of compounds represented by formula (2) as a first component:

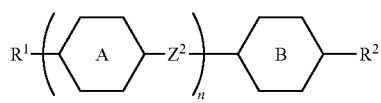
(2)

in formula (2), $R^1$ and $R^2$ are independently alkyl having 1 to 12 carbons, alkoxy having 1 to 12 carbons, alkenyl having 2 to 12 carbons or alkenyl having 2 to 12 carbons in which at least one hydrogen has been replaced by fluorine;

ring A and ring B are independently 1,4-cyclohexylene, 1,4-phenylene, 2-fluoro-1,4-phenylene or 2,5-difluoro-1,4-phenylene;

$Z^2$ is a single bond, ethylene, vinylene in which hydrogen has been replaced by fluorine, methyleneoxy or carbonyloxy; and n is 1, 2 or 3.

9. The liquid crystal composition of item 8, wherein the first component is at least one compound selected from the group of compounds represented by formula (2-1) to formula (2-13):

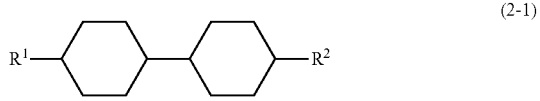
(2-1)

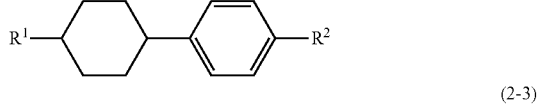
(2-2)

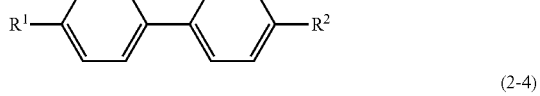
(2-3)

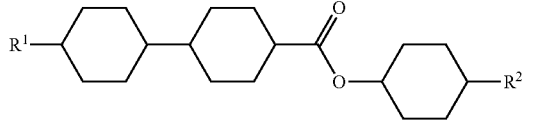
(2-4)

(2-5)

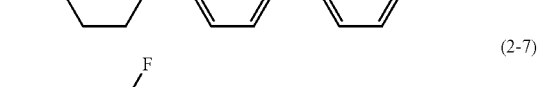
(2-6)

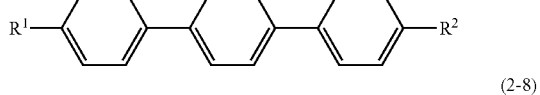
(2-7)

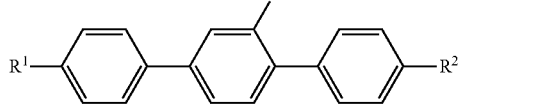
(2-8)

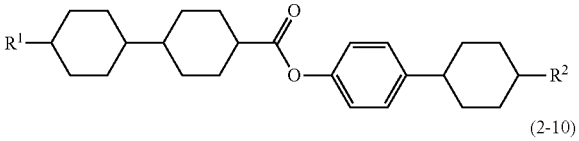
(2-9)

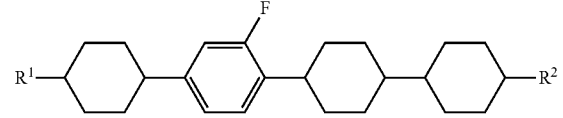
(2-10)

-continued

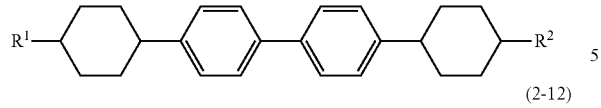
(2-11)

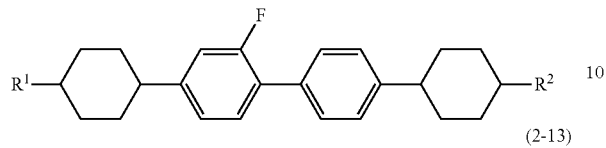
(2-12)

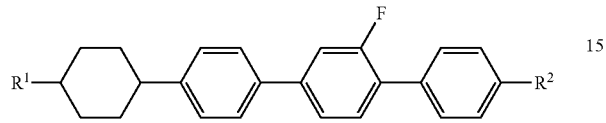
(2-13)

in formula (2-1) to formula (2-13), $R^1$ and $R^2$ are independently alkyl having 1 to 12 carbons, alkoxy having 1 to 12 carbons, alkenyl having 2 to 12 carbons, or alkenyl having 2 to 12 carbons in which at least one hydrogen has been replaced by fluorine.

10. The liquid crystal composition of item 9, wherein the first component is a mixture of at least one compound selected from the group of compounds represented by formula (2-1) and at least one compound selected from the group of compounds represented by formula (2-2) to formula (2-13) of item 9.

11. The liquid crystal composition of any one of items 8 to 10, wherein the proportion of the first component is in the range of 10 wt % to 90 wt % based on the weight of the liquid crystal composition.

12. The liquid crystal composition of item 8, including at least one compound selected from the group of compounds represented by formula (3) as a second component:

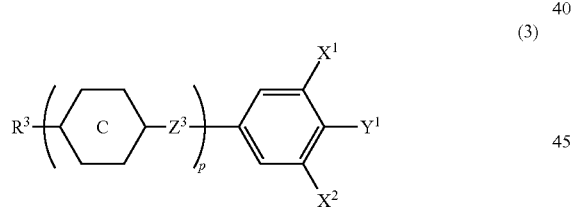
(3)

in formula (3), $R^3$ is alkyl having 1 to 12 carbons, alkoxy having 1 to 12 carbons, or alkenyl having 2 to 12 carbons;

ring C is 1,4-cyclohexylene, 1,4-phenylene, 2-fluoro-1,4-phenylene, 2,6-difluoro-1,4-phenylene, pyrimidine-2,5-diyl, 1,3-dioxane-2,5-diyl or tetrahydropyran-2,5-diyl;

$X^1$ and $X^2$ are independently hydrogen or fluorine;

$Y^1$ is fluorine, chlorine, trifluoromethyl or trifluoromethoxy;

$Z^3$ is a single bond, ethylene, carbonyloxy or difluoromethyleneoxy; and p is 1, 2 or 3.

13. The liquid crystal composition of item 12, wherein the second component is at least one compound selected from the group of compounds represented by formula (3-1) to formula (3-18):

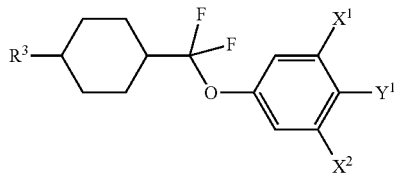
(3-1)

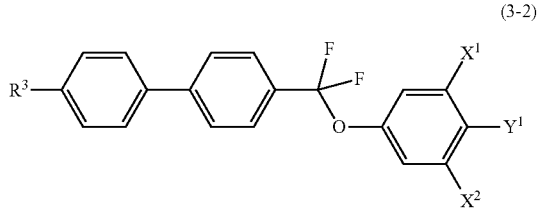
(3-2)

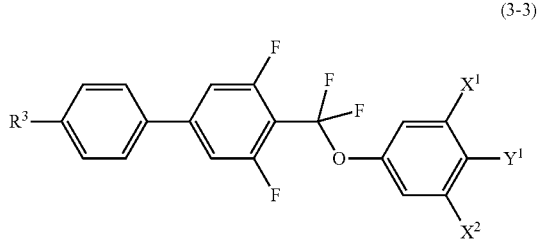
(3-3)

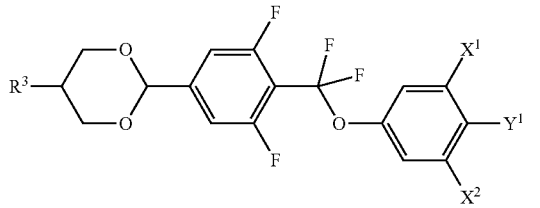
(3-4)

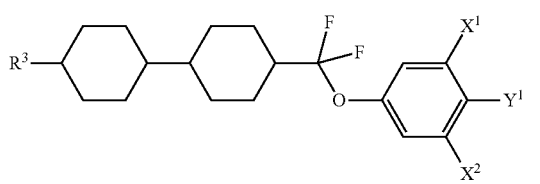
(3-5)

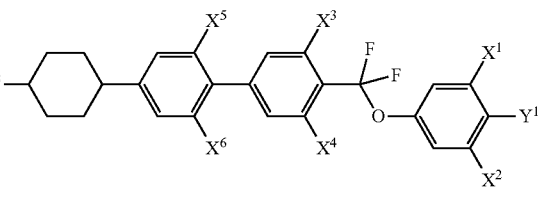
(3-6)

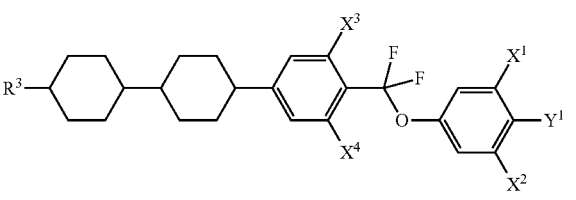
(3-7)

-continued (3-8)
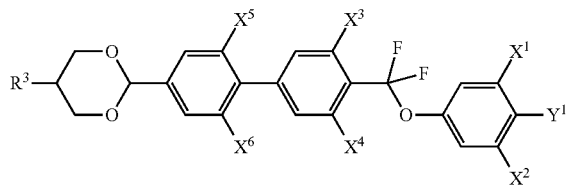

(3-9)
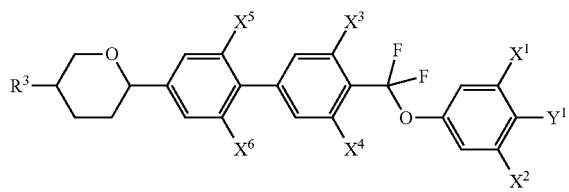

(3-10)
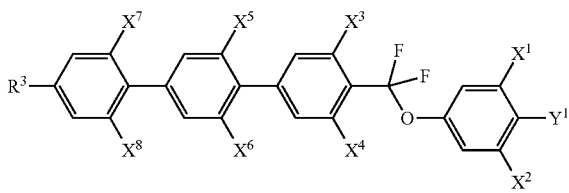

(3-11)
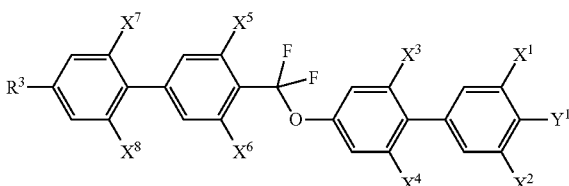

(3-12)
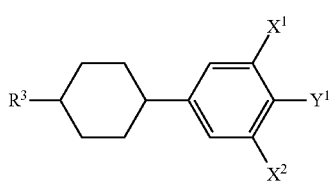

(3-13)
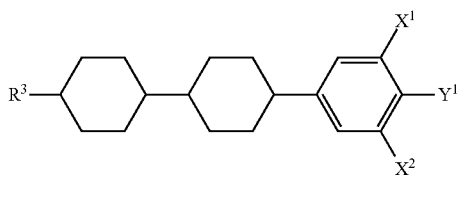

(3-14)
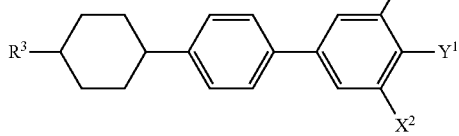

(3-15)
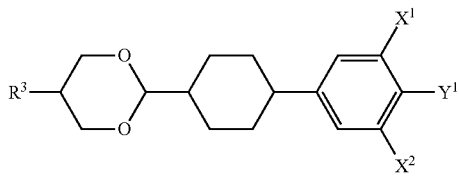

(3-16)
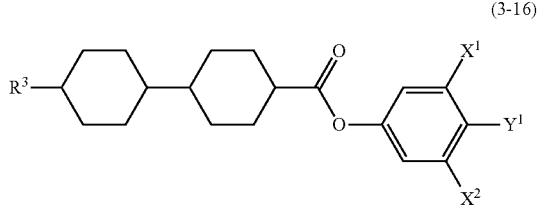

(3-17)
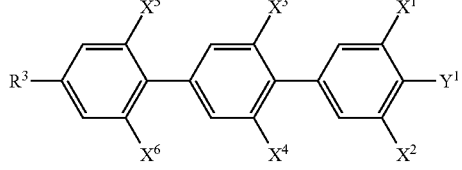

(3-18)
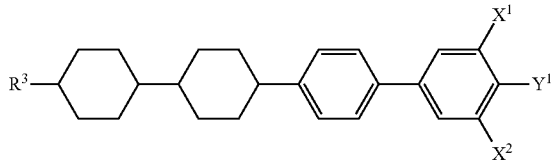

in formula (3-1) to formula (3-18), $R^3$ is alkyl having 1 to 12 carbons, alkoxy having 1 to 12 carbons, or alkenyl having 2 to 12 carbons;

$X^1$, $X^2$, $X^3$, $X^4$, $X^5$, $X^6$, $X^7$ and $X^8$ are independently hydrogen or fluorine; and $Y^1$ is fluorine, chlorine, trifluoromethyl or trifluoromethoxy.

14. The liquid crystal composition of item 13, wherein the second component is a mixture of at least one compound selected from the group of compounds represented by formula (3-6) and at least one compound selected from the group of compounds represented by formulas (3-1) to (3-5) and formulas (3-7) to (3-18) of item 13.

15. The liquid crystal composition of any one of items 12 to 14, wherein the proportion of the second component is in the range of 10 wt % to 90 wt % based on the weight of the liquid crystal composition.

16. The liquid crystal composition of item 8, including at least one compound selected from the group of compounds represented by formula (4) as a third component:

(4)
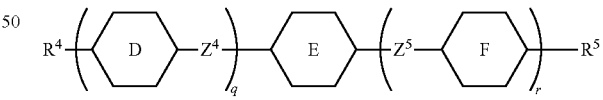

in formula (4), $R^4$ and $R^5$ are independently alkyl having 1 to 12 carbons, alkoxy having 1 to 12 carbons, alkenyl having 2 to 12 carbons, or alkenyl having 2 to 12 carbons in which at least one hydrogen has been replaced by fluorine;

ring D and ring F are independently 1,4-cyclohexylene, 1,4-phenylene, 1,4-phenylene in which at least one hydrogen has been replaced by fluorine or chlorine, or tetrahydropyran-2,5-diyl;

ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl;

$Z^4$ and $Z^5$ are independently a single bond, ethylene, methyleneoxy or carbonyloxy; and q is 1, 2 or 3, r is 0 or 1, and the sum of q and r is 1, 2 or 3.

17. The liquid crystal composition of item 16, wherein the third component is at least one compound selected from the group of compounds represented by formula (4-1) to formula (4-19):

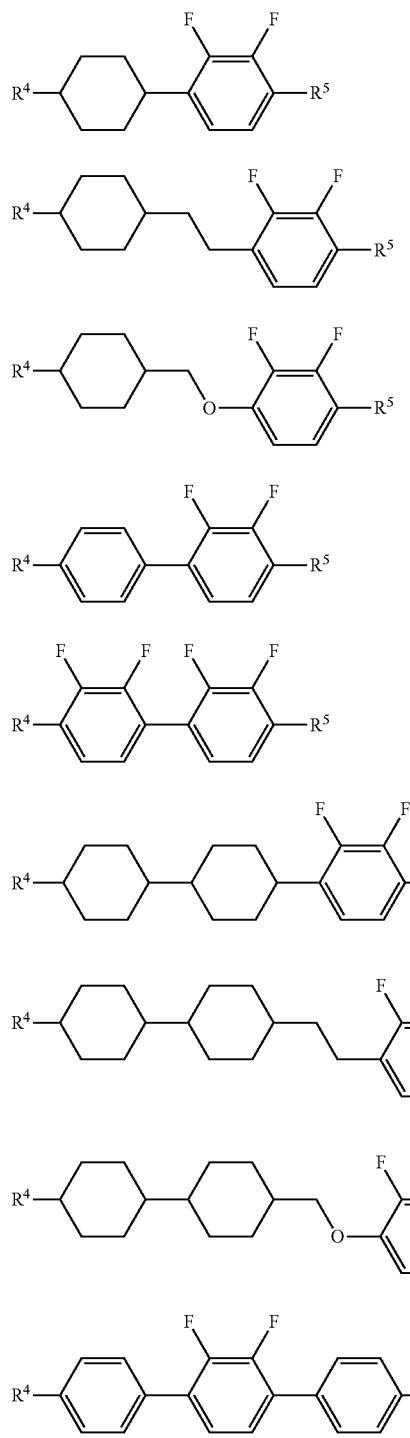

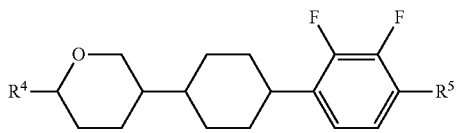
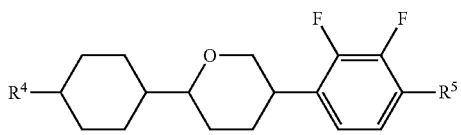
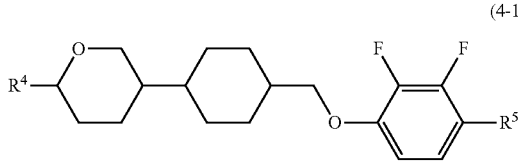
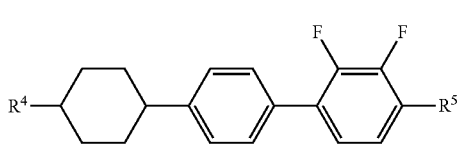
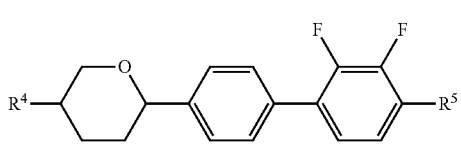
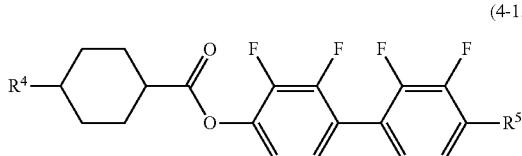
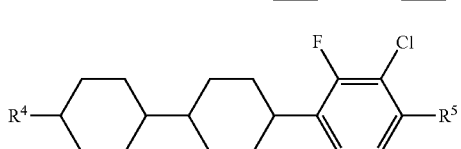
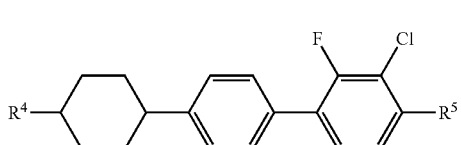
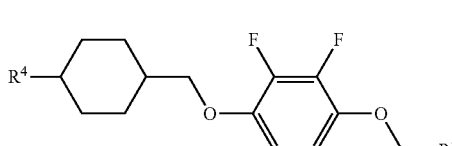

in formula (4-1) to formula (4-19), $R^4$ and $R^5$ are independently alkyl having 1 to 12 carbons, alkoxy having 1 to 12 carbons, alkenyl having 2 to 12 carbons, or alkenyl having 2 to 12 carbons in which at least one hydrogen has been replaced by fluorine.

18. The liquid crystal composition of item 17, wherein the third component is a mixture of at least one compound selected from the group of compounds represented by formula (4-4) and at least one compound selected from the group of compounds represented by formulas (4-1) to (4-3) and formulas (4-5) to (4-19) of item 17.

19. The liquid crystal composition of any one of items 16 to 19, wherein the proportion of the third component is in the range of 10 wt % to 90 wt % based on the weight of the liquid crystal composition.

20. The liquid crystal composition of any one of items 1 to 19, wherein the maximum temperature of a nematic phase is 70° C. or higher, and the optical anisotropy measured at 25° C. at the wavelength of 589 nanometers is 0.07 or more.

21. A liquid crystal display device containing the liquid crystal composition of any one of items 1 to 20.

22. The liquid crystal display device of item 21, wherein the operating mode of the liquid crystal display device is a TN mode, an ECB mode, an OCB mode, a VA mode, an IPS mode, a PSA mode, an FFS mode or an FPA mode, and the driving mode of the liquid crystal display device is an active matrix mode.

23. Use of the liquid crystal composition of any one of items 1 to 20 for a liquid crystal display device.

24. A compound represented by formula (1-1-a) or (1-2-a):

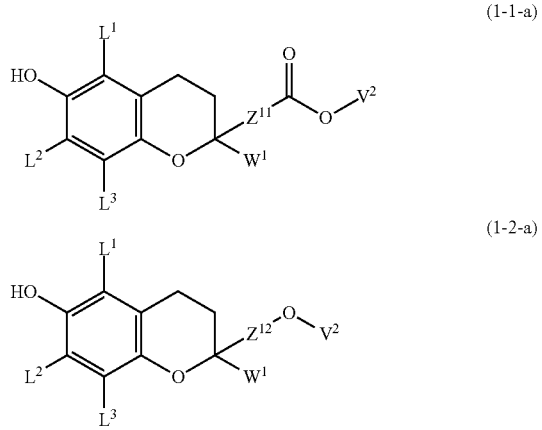

in formula (1-1-a) or formula (1-2-a), $L^1$, $L^2$ and $L^3$ are independently hydrogen, fluorine or —$CH_3$; $W^1$ is hydrogen or alkyl having 1 to 10 carbons, and in the alkyl, at least one —$CH_2$— may be replaced by —O—, one or two —$CH_2$—$CH_2$— may be replaced by —CH=CH—, and at least one hydrogen may be replaced by fluorine or chlorine;

$V^2$ is —$(CH_2)_j$—$CH(CH_3)_2$ (j is an integer from 0 to 17) or alkenyl having 2 to 20 carbons, and in this —$(CH_2)_j$—$CH(CH_3)_2$ or alkenyl, at least one hydrogen may be replaced by fluorine or chlorine;

$Z^{11}$ is alkylene having 1 to 5 carbons or a single bond; and $Z^{12}$ is alkylene having 1 to 5 carbons.

25. The compound of item 24, wherein in formula (1-1-a) or (1-2-a) of item 24, $V^2$ is —$(CH_2)_j$—$CH(CH_3)_2$ (j is an integer from 0 to 5).

26. Use of the compound of item 24 or 25 as an antioxidant.

27. A method of preventing deterioration of a liquid crystal composition by adding the compound of item 24 or 25 to the liquid crystal composition.

The invention further includes the following items: a) the composition described above further including at least one antioxidant different from the compound represented by formula (1), b) the composition described above further including an antioxidant represented by formula (5) described below with k being an integer from 1 to 9, c) the composition described above further including an antioxidant of formula (5) of k=1 described below, d) the composition described above further including an antioxidant of formula (5) of k=7 described below,

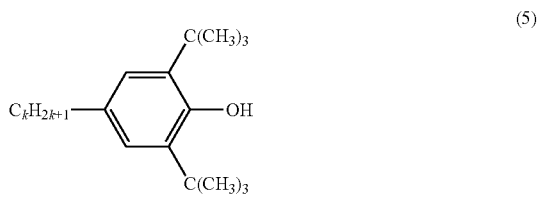

e) the composition described above further including an optically active compound, f) the composition described above further including an additive such as a polymerizable compound, a polymerization initiator, a polymerization inhibitor, an optically active compound, a UV light absorbent, a light stabilizer, a thermal stabilizer, an antifoaming agent and/or a pigment, g) an AM device containing the composition described above, h) a device containing the composition described above and having a mode of TN, ECB, OCB, VA, IPS, FFS, PSA or FPA, i) a transmission-type device containing the composition described above, j) use of the composition described above as a composition having a nematic phase, k) use of the composition prepared by adding an optically active compound to the composition described above as an optically active composition, and l) the composition of item 1 further including at least one compound selected from the group of compounds represented by formula (2) as a first component, at least one compound selected from the group of compounds represented by formula (3) as a second component, and at least one compound selected from the group of compounds represented by formula (4) as a third component.

The composition of the invention will be explained in the following order. First, the constitution of component compounds in the composition is explained. Second, the main characteristics of the component compounds and the main effects of these compounds on the composition are explained. Third, combinations of the components in the composition, desirable proportions of the components and their basis are explained. Fourth, desirable embodiments of the component compounds are explained. Fifth, specific examples of the component compounds are shown. Sixth, additives that may be mixed with the composition are explained. Seventh, methods for synthesizing the component compounds are explained. Last, the use of the composition is explained.

First, the constitution of component compounds in the composition is explained. The compositions of the invention are classified into composition A and composition B. Composition A includes compound (1) and may further include any other liquid crystal compound, an additive and an impurity, in addition to liquid crystal compounds selected from compounds (2), (3) and (4). "Any other liquid crystal compound" is a liquid crystal compound that is different from compounds (2), (3) and (4). Such a compound is mixed in the composition for the purpose of further adjusting the characteristics. Examples of the additive include a polymerizable compound, a polymerization initiator, a polymerization inhibitor, an optically active compound, an antioxidant different from compound (1), a UV light absorbent, a light stabilizer, a thermal stabilizer, an antifoaming agent and a pigment, etc. The impurity is compounds and so forth which have contaminated component compounds in a process such as their synthesis.

Composition B consists essentially of compounds selected from the group of compounds (1), (2), (3) and (4). The term "essentially" means that the composition may include an additive and an impurity, but does not include any liquid crystal compound different from compounds (2), (3) and (4). Composition B has a smaller number of components than composition A. Composition B is preferable to composition A in view of cost reduction. Composition A is preferable to composition B in view of the fact that the characteristics can be further adjusted by adding any other liquid crystal compound.

Second, main characteristics of the component compounds and main effects of the compounds on the characteristics of the composition are explained. The main characteristics of the liquid crystal compounds are summarized in Table 2 on the basis of the effects of the invention. In Table 2, the symbol L stands for "large" or "high", the symbol M stands for "medium", and the symbol S stands for "small" or "low." The symbols L, M and S mean a classification based on a qualitative comparison among the component compounds, and 0 (zero) means that "the value is nearly zero."

TABLE 2

Characteristics of Compounds

| | Compounds | | |
|---|---|---|---|
| | Compound (2) | Compound (3) | Compound (4) |
| Maximum Temperature | S-L | S-L | S-M |
| Viscosity | S-M | M-L | M-L |
| Optical Anisotropy | S-L | M-L | M-L |
| Dielectric Anisotropy | 0 | S-L | M-L [1)] |
| Specific Resistance | L | L | L |

[1)] The value of dielectric anisotropy is negative, and the symbol expresses the magnitude of the absolute value.

The main effects of the component compounds on the characteristics of the composition upon mixing the component compounds in the composition are as follows. Compound (1) is useful to prevent deterioration of a liquid crystal composition. This compound increases the stability to UV light or heat. Compound (2) has a small dielectric anisotropy. This compound increases the maximum temperature and decreases the viscosity. Compound (3) has a large positive dielectric anisotropy. This compound increases the dielectric anisotropy and decreases the minimum temperature. Compound (4) has a large negative dielectric anisotropy. This compound increases the dielectric anisotropy and decreases the minimum temperature. The dielectric constants ($\varepsilon_\parallel$ and $\varepsilon_\perp$) of a composition having positive dielectric anisotropy can be adjusted by the addition of a small amount of a compound having negative dielectric anisotropy to this composition. The dielectric constants ($\varepsilon_\parallel$ and $\varepsilon_\perp$) of a composition having negative dielectric anisotropy can be adjusted by the addition of a small amount of a compound having positive dielectric anisotropy to this composition.

Third, combinations of the components in the composition, desirable proportions of the components and their basis are explained. Combinations of the components in the composition include: compound (1), compound (1)+the first component, compound (1)+the second component, compound (1)+the third component, compound (1)+the first component+the second component, compound (1)+the first component+the third component, compound (1)+the second component+the third component, and compound (1)+the first component+the second component+the third component. The desirable combinations of the components in the composition include compound (1)+the first component+the second component, and compound (1)+the first component+the third component. The combination of compound (1)+the first component+the second component+the third component is desirable for adjusting the dielectric constants of the composition.

A desirable proportion of compound (1) is about 0.005 wt % or more for increasing the stability to UV light or heat, and about 3 wt % or less for decreasing the minimum temperature. A more desirable proportion is in the range of about 0.01 wt % to about 1.0 wt %. A particularly desirable proportion is in the range of about 0.03 wt % to about 0.5 wt %.

A desirable proportion of the first component is about 10 wt % or more for increasing the maximum temperature or for decreasing the viscosity, and about 90 wt % or less for increasing the dielectric anisotropy. A more desirable proportion is in the range of about 20 wt % to about 80 wt %. A particularly desirable proportion is in the range of about 30 wt % to about 70 wt %.

A desirable proportion of the second component is about 10 wt % or more for increasing the dielectric anisotropy, and about 90 wt % or less for decreasing the minimum temperature. A more desirable proportion is in the range of about 20 wt % to about 80 wt %. A particularly desirable proportion is in the range of about 30 wt % to about 60 wt %.

A desirable proportion of the third component is about 10 wt % or more for increasing the dielectric anisotropy, and about 90 wt % or less for decreasing the viscosity. A more desirable proportion is in the range of about 20 wt % to about 80 wt %. A particularly desirable proportion is in the range of about 30 wt % to about 70 wt %.

Fourth, desirable embodiments of the component compounds are explained. In compound (1), $L^1$, $L^2$, $L^3$ and $W^1$ are independently hydrogen, halogen, —COOH or alkyl having 1 to 10 carbons, and in the alkyl, at least one —$CH_2$— may be replaced by —O— or —S—, at least one —$CH_2$—$CH_2$— may be replaced by —CH=CH—, and at least one hydrogen may be replaced by halogen. Desirable $L^1$, $L^2$, $L^3$ or $W^1$ is alkyl having 1 to 10 carbons for decreasing the minimum temperature. More desirable $L^1$, $L^2$, $L^3$ or $W^1$ is alkyl having 1 to 3 carbons. Especially desirable $L^1$, $L^2$, $L^3$ or $W^1$ is methyl.

$V^1$ is alkyl having 1 to 30 carbons, and in the alkyl, at least one —$CH_2$— may be replaced by —O—, —CO—, —OCO—, —OCO—, —OCOO— or —NH—, at least one —$CH_2CH_2$— may be replaced by —CH=CH— or —C≡C—, at least one —$CH_3$ may be replaced by —OH, —SH, —C≡N, —COOH, —$NO_2$ or —$NH_2$, and at least one hydrogen may be replaced by halogen. Desirable V' is alkyl having 1 to 20 carbons in which at least one —$CH_2$— may be replaced by —COO— for increasing the stability to UV light or heat. More desirable $V^1$ is alkyl having 1 to 20 carbons in which one —$CH_2$— has been replaced by —COO—. Particularly desirable $V^1$ is —OCO—$(CH_2)_j$—CH$(CH_3)_2$, wherein j is an integer of 1 to 17. Desirable j is an integer of 1 to 10, and more desirable j is an integer of 1 to 5.

In compounds (2) to (4), $R^1$, $R^2$, $R^4$ and $R^5$ are independently alkyl having 1 to 12 carbons, alkoxy having 1 to 12 carbons, alkenyl having 2 to 12 carbons, or alkenyl having 2 to 12 carbons in which at least one hydrogen has been replaced by fluorine. $R^3$ is alkyl having 1 to 12 carbons, alkoxy having 1 to 12 carbons, or alkenyl having 2 to 12 carbons. Desirable $R^1$, $R^2$, $R^3$ or $R^4$ is alkyl having 1 to 12 carbons for increasing the stability to UV light or heat, or alkenyl having 2 to 12 carbons for decreasing the minimum temperature and for decreasing the viscosity. Desirable $R^5$ is alkoxy having 1 to 12 carbons for increasing the dielectric anisotropy, or alkyl having 1 to 12 carbons for increasing the stability to UV light or heat. More desirable $R^1$, $R^2$ and $R^4$ are alkenyl having 2 to 12 carbons for decreasing the viscosity.

Desirable alkyl is methyl, ethyl, propyl, butyl, pentyl, hexyl, heptyl or octyl. More desirable alkyl is ethyl, propyl, butyl, pentyl or heptyl for decreasing the viscosity.

Desirable alkoxy is methoxy, ethoxy, propoxy, butoxy, pentyloxy, hexyloxy or heptyloxy. More desirable alkoxy is methoxy or ethoxy for decreasing the viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. More desirable alkenyl is vinyl, 1-propenyl, 3-butenyl or 3-pentenyl for decreasing the viscosity. The desirable configuration of —CH=CH— in the alkenyl depends on the position of the double bond. Trans is preferred for alkenyl groups such as 1-propenyl, 1-butenyl, 1-pentenyl, 1-hexenyl, 3-pentenyl and 3-hexenyl for decreasing the viscosity. Cis is preferred for groups the alkenyl such as 2-butenyl, 2-pentenyl and 2-hexenyl.

Desirable examples of alkenyl in which at least one hydrogen has been replaced by fluorine are 2,2-difluorovinyl, 3,3-difluoro-2-propenyl, 4,4-difluoro-3-butenyl, 5,5-difluoro-4-pentenyl and 6,6-difluoro-5-hexenyl. More desirable examples are 2,2-difluorovinyl and 4,4-difluoro-3-butenyl for decreasing the viscosity.

Ring A and ring B are independently 1,4-cyclohexylene, 1,4-phenylene, 2-fluoro-1,4-phenylene or 2,5-difluoro-1,4-phenylene. Two groups represented by arbitrary two rings A may be the same or different when n is 2 or 3. Desirable ring A or ring B is 1,4-cyclohexylene for decreasing the viscosity, or 1,4-phenylene for increasing the optical anisotropy.

Ring C is 1,4-cyclohexylene, 1,4-phenylene, 2-fluoro-1,4-phenylene, 2,6-difluoro-1,4-phenylene, pyrimidine-2,5-diyl, 1,3-dioxane-2,5-diyl or tetrahydropyran-2,5-diyl. Two groups represented by arbitrary two rings C may be the same or different when p is 2 or 3. Desirable ring C is 1,4-cyclohexylene for decreasing the viscosity, 1,4-phenylene for increasing the optical anisotropy, or tetrahydropyran-2,5-diyl for increasing the dielectric anisotropy.

Ring D and ring F are independently 1,4-cyclohexylene, 1,4-phenylene, 1,4-phenylene in which at least one hydrogen has been replaced by fluorine or chlorine or tetrahydropyran-2,5-diyl. Two groups represented by arbitrary two rings D may be the same or different when q is 2 or 3. Desirable examples of 1,4-phenylene in which at least one hydrogen has been replaced by fluorine or chlorine are 2-fluoro-1,4-phenylene, 2,3-difluoro-1,4-phenylene and 2-chloro-3-fluoro-1,4-phenylene. Desirable ring D or ring F is 1,4-cyclohexylene for decreasing the viscosity, 1,4-phenylene for increasing the optical anisotropy, or tetrahydropyran-2,5-diyl for increasing the dielectric anisotropy.

Ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Desirable ring E is 2,3-difluoro-1,4-phenylene or 7,8-difluorochroman-2,6-diyl for increasing the dielectric anisotropy.

$Z^2$ is a single bond, ethylene (—$CH_2CH_2$—), vinylene in which hydrogen has been replaced by fluorine (—CF=CF—), methyleneoxy (—$CH_2$O—, —O$CH_2$—) or carbonyloxy (—COO—, —OCO—). Two groups represented by arbitrary two $Z^2$ may be the same or different when n is 2 or 3. Desirable $Z^2$ is a single bond for decreasing the viscosity, or carbonyloxy for increasing the maximum temperature.

$Z^3$ is a single bond, ethylene, carbonyloxy or difluoromethyleneoxy (—$CF_2$O—, —O$CF_2$—). Two groups represented by arbitrary two $Z^3$ may be the same or different when p is 2 or 3. Desirable $Z^3$ is a single bond for decreasing the viscosity, or difluoromethyleneoxy for increasing the dielectric anisotropy.

$Z^4$ and $Z^5$ are independently a single bond, ethylene, methyleneoxy or carbonyloxy. Two groups represented by arbitrary two $Z^4$ may be the same or different when q is 2 or 3. Desirable $Z^4$ or $Z^5$ is a single bond for decreasing the viscosity, or methyleneoxy for increasing the dielectric anisotropy.

$X^1$ and $X^2$ are independently hydrogen or fluorine. Desirable $X^1$ or $X^2$ is fluorine for increasing the dielectric anisotropy, or hydrogen for decreasing the viscosity.

$Y^1$ is fluorine, chlorine, trifluoromethyl or trifluoromethoxy. Desirable $Y^1$ is fluorine for decreasing the viscosity.

n is 1, 2 or 3. Desirable n is 1 for decreasing the viscosity, or is 2 or 3 for increasing the maximum temperature.

p is 1, 2 or 3. Desirable p is 1 for decreasing the minimum temperature, or is 2 or 3 for increasing the maximum temperature.

q is 1, 2 or 3, r is 0 or 1, and the sum of q and r is 1, 2 or 3. Desirable q is 1 for decreasing the minimum temperature. Desirable r is 0 for decreasing the viscosity.

In compounds (2) to (4), alkyl has a straight or branched chain, and does not include cycloalkyl. Straight-chain alkyl is preferable to branched-chain alkyl. This applies to alkoxy, alkenyl and alkenyl in which hydrogen has been replaced by fluorine. With regard to the configuration of 1,4-cyclohexylene, trans is preferable to cis for increasing the maximum temperature. 2,6-Difluoro-1,4-phenylene means the following facing right (R) and facing left (L) in a chemical formula, and the facing right (R) is preferable to the facing left (L) for increasing the dielectric anisotropy.

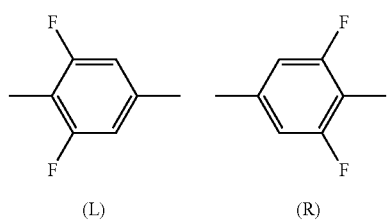

(L)  (R)

Fifth, specific examples of the component compounds are shown. Desirable compounds (1) are compounds (1-1) to (1-5) described in item 2. In these compounds, the definitions of the symbols such as $W^1$ are the same as those in the description of item 2. More desirable compounds (1) are compounds (1-1-1) to (1-5-1) described below. Among these compounds, compounds (1-1-1) and (1-2-1) are desirable. Compound (1-1-1) is more desirable.

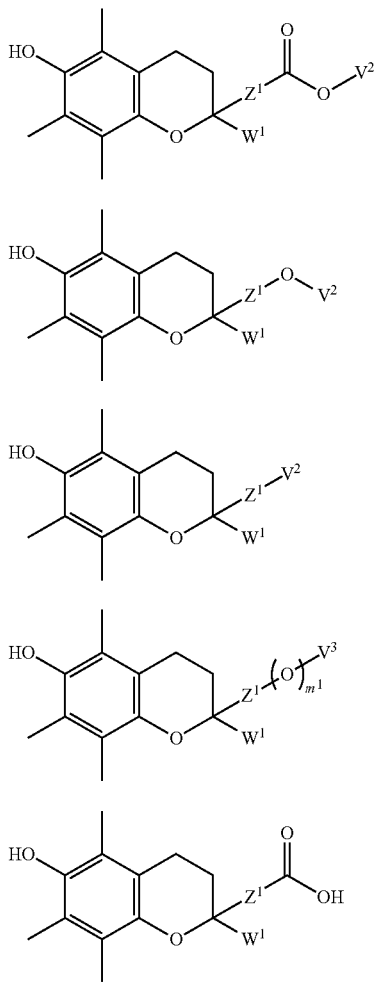

In these compounds, $W^1$ is hydrogen, fluorine, chlorine, methyl or —$(CH_2)_j$—$CH(CH_3)_2$ (j is an integer of 0 to 17), and in this —$(CH_2)_j$—$CH(CH_3)_2$, one, two or three —$CH_2$— may be replaced by —O—, one —$CH_2$—$CH_2$— may be replaced by —CH=CH—, and at least one hydrogen may be replaced by fluorine;

$V^2$ is alkyl having 1 to 20 carbons or alkenyl having 2 to 20 carbons, and in the alkyl and alkenyl, at least one hydrogen may be replaced by fluorine or chlorine;

$V^3$ is —$NO_2$ or —$NH_2$;

$Z^1$ is alkylene having 1 to 5 carbons or a single bond; and $m^1$ is 0 or 1.

Desirable compound (1-1-1) is compound (1-1-a) described in item 24. Desirable compound (1-1-2) is compound (1-2-a) described in item 24. In these compounds, the definitions of the symbols such as $W^1$ are the same as those in the description of item 24. More desirable compound (1-1-1) is compound (1-1-1-3) or (1-1-1-4).

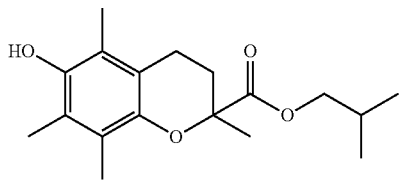

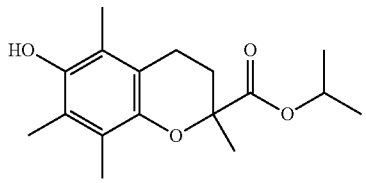

Desirable compounds (2) are compounds (2-1-1) to (2-13-1). More desirable compounds (2) are compounds (2-1-1) to (2-3-1) and compounds (2-5-1) to (2-13-1). Particularly desirable compounds (2) are compounds (2-1-1), (2-2-1), (2-8-1) and (2-13-1). Desirable compounds (3) are compounds (3-1-1) to (3-18-1), (3-10-2) and (3-17-2). More desirable compounds (3) are compounds (3-1-1) to (3-11-1). Particularly desirable compounds (3) are compounds (3-2-1) to (3-11-1). Desirable compounds (4) are compounds (4-1-1) to (4-19-1). More desirable compounds (4) are compounds (4-1-1) to (4-14-1). Particularly desirable compounds (4) are compounds (4-4-1), (4-8-1) and (4-11-1).

In these desirable compounds, $R^6$ and $R^7$ are independently straight-chain alkyl having 1 to 12 carbons, straight-chain alkoxy having 1 to 12 carbons, straight-chain alkenyl having 2 to 12 carbons, or straight-chain alkenyl having 2 to 12 carbons in which at least one hydrogen has been replaced by fluorine. $R^8$ is straight-chain alkyl having 1 to 12 carbons or straight-chain alkenyl having 2 to 12 carbons. $R^9$ and $R^{10}$ are independently straight-chain alkyl having 1 to 12 carbons, straight-chain alkoxy having 1 to 12 carbons, or straight-chain alkenyl having 2 to 12 carbons. $X^3$ and $X^4$ are independently hydrogen or fluorine.

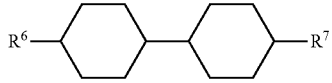

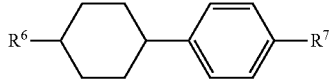

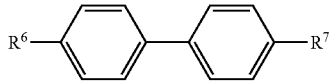

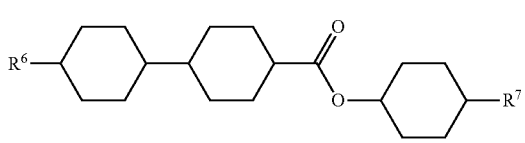

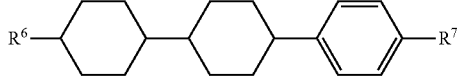

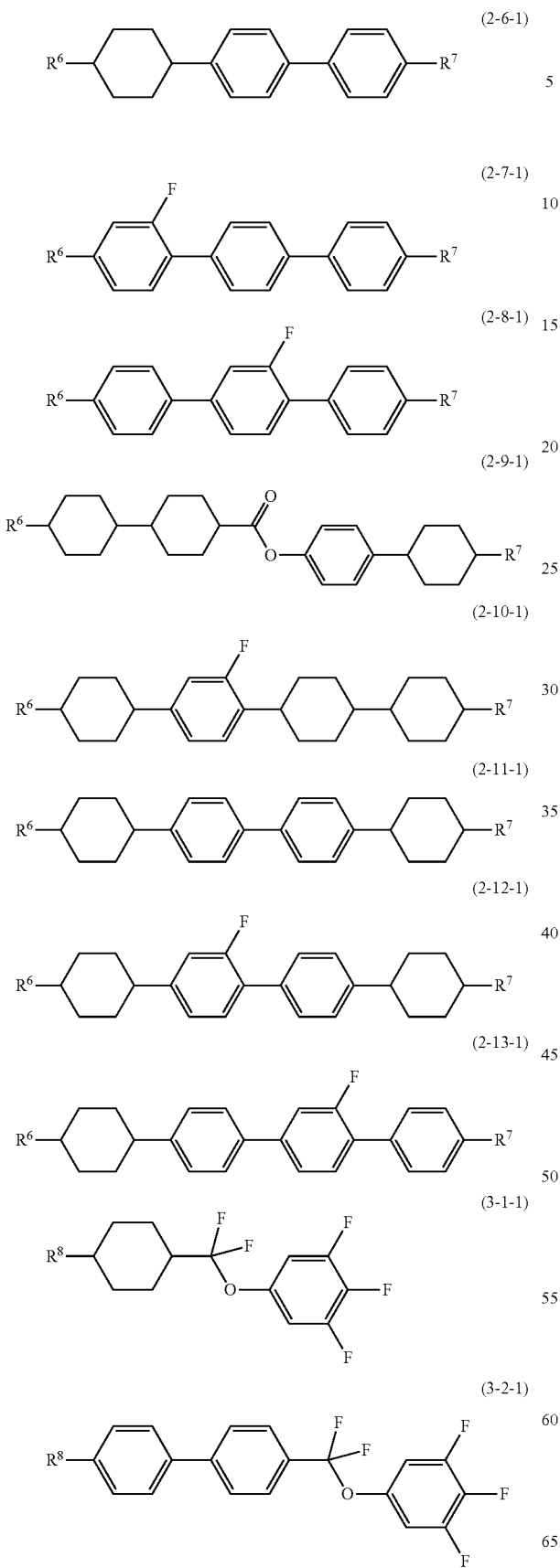
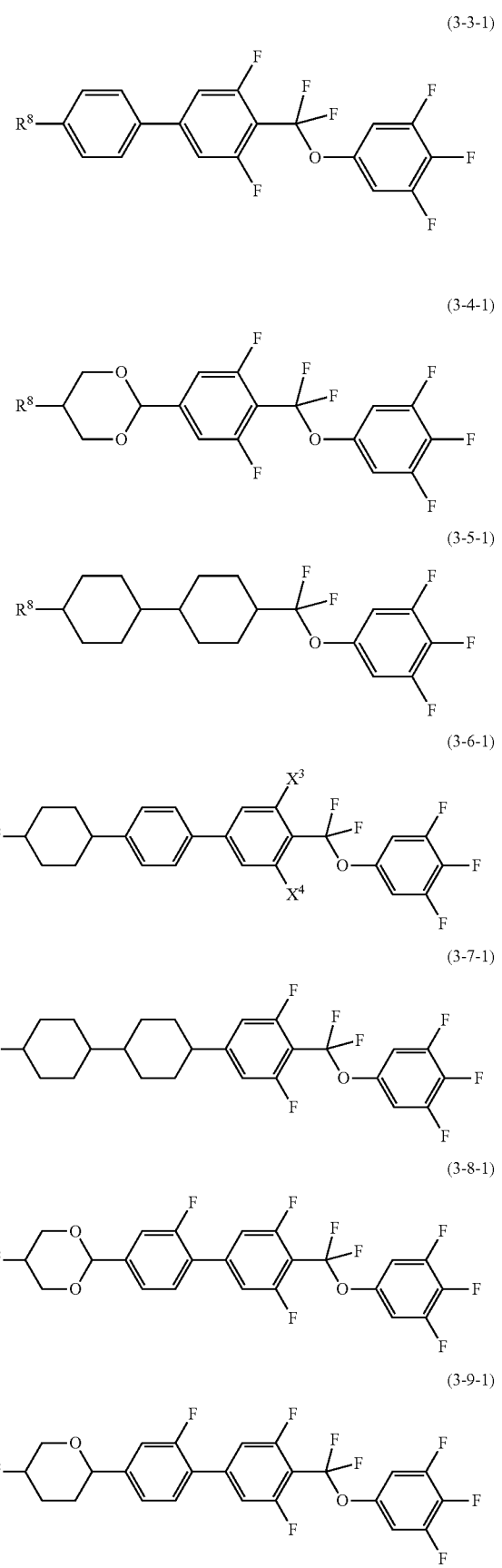

(3-10-1)
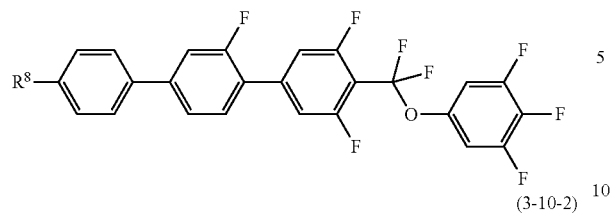
(3-10-2)
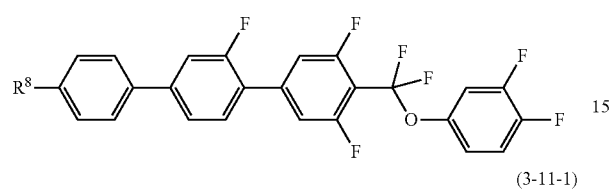
(3-11-1)
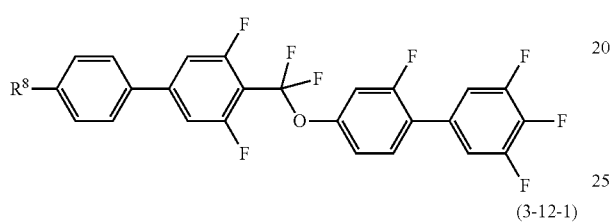
(3-12-1)
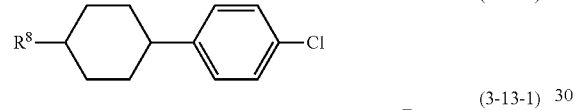
(3-13-1)
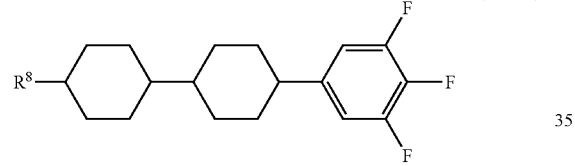
(3-14-1)
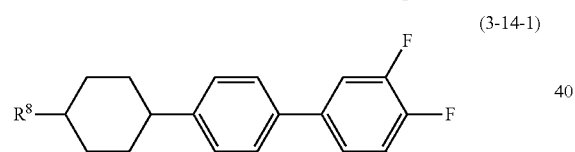
(3-15-1)
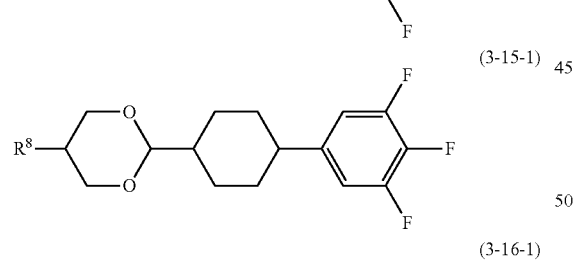
(3-16-1)
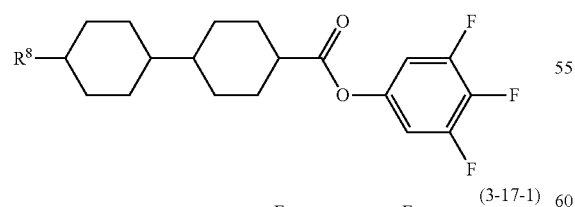
(3-17-1)
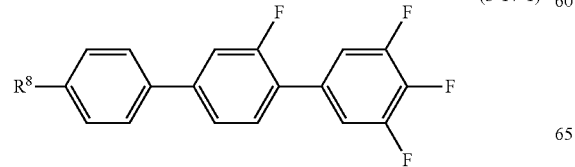
(3-17-2)
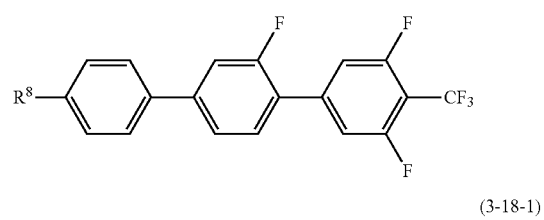
(3-18-1)
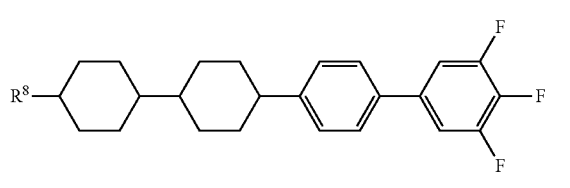
(4-1-1)
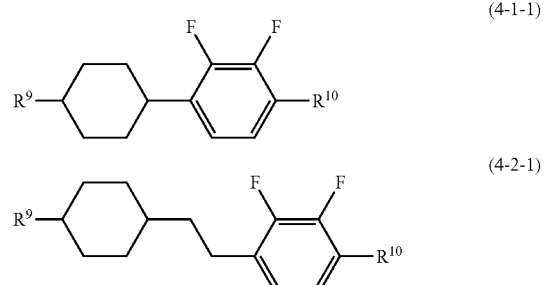
(4-2-1)
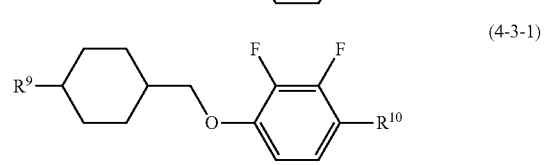
(4-3-1)
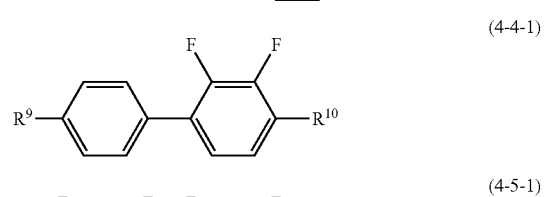
(4-4-1)
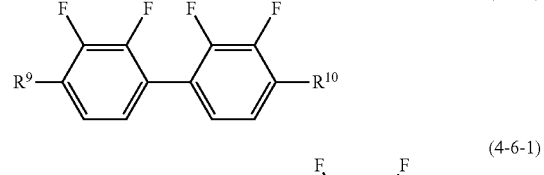
(4-5-1)
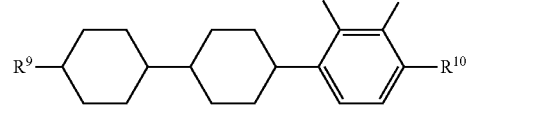
(4-6-1)
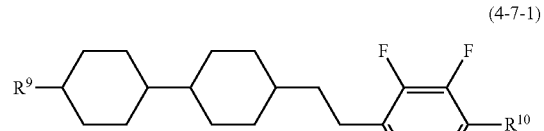
(4-7-1)
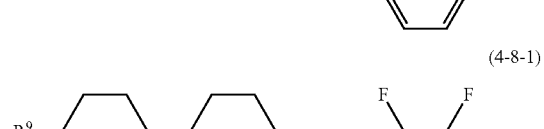
(4-8-1)
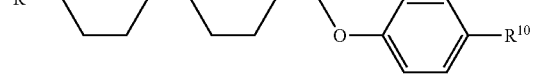

(4-9-1)
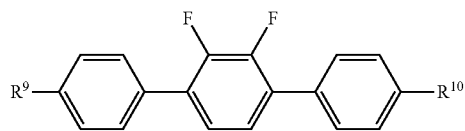

(4-10-1)
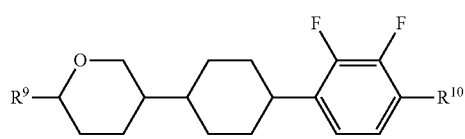

(4-11-1)
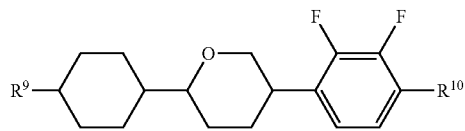

(4-12-1)
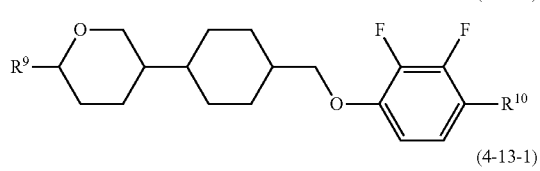

(4-13-1)
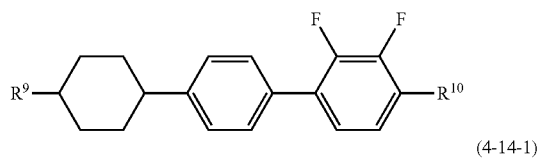

(4-14-1)
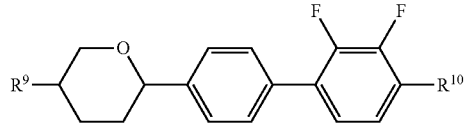

(4-15-1)
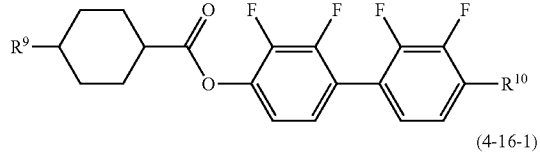

(4-16-1)
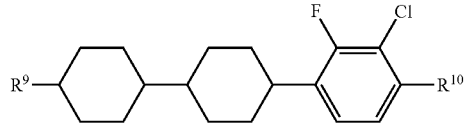

(4-17-1)
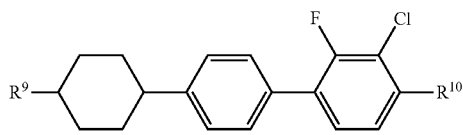

(4-18-1)
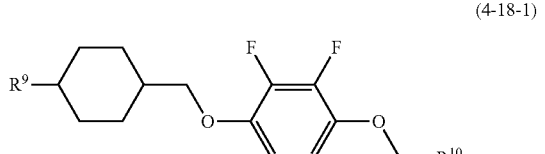

(4-19-1)
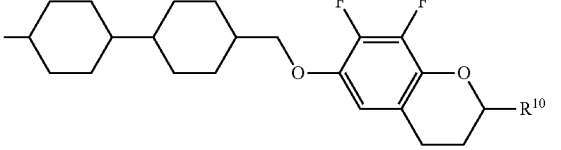

Sixth, additives that may be mixed in the composition are explained. Such additives include a polymerizable compound, a polymerization initiator, a polymerization inhibitor, an optically active compound, an antioxidant different from compound (1), a UV light absorbent, a light stabilizer, a thermal stabilizer, an antifoaming agent and a pigment.

A polymerizable compound is used for adaption to a device having a polymer sustained alignment (PSA) mode. First, a liquid crystal composition into which a small amount of a polymerizable compound is added is injected to a device. Next, the composition is irradiated with UV light while a voltage is applied between the substrates of this device. The polymerizable compound is polymerized to form a network of polymer in the composition. In this composition, the orientation of the liquid crystal molecules can be controlled by the polymer, and thus the response time of the device is decreased and image burn-in is improved. Such effect of the polymer can be expected in a device having a mode such as TN, ECB, OCB, IPS, FFS and VA.

Desirable examples of the polymerizable compound include acrylates, methacrylates, vinyl compounds, vinyloxy compounds, propenyl ethers, epoxy compounds (oxiranes, oxetanes) and vinyl ketones. More desirable examples are acrylate derivatives and methacrylate derivatives. Examples of the polymerizable compound are compounds (M-1) to (M-12). Among these compounds, $R^{20}$, $R^{21}$ and $R^{22}$ are independently hydrogen or methyl; s is 0 or 1; and t and u are independently an integer from 1 to 10. The symbol F in parentheses means hydrogen or fluorine.

(M-1)
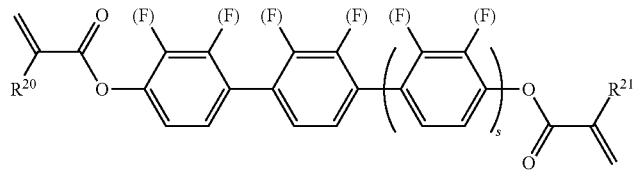

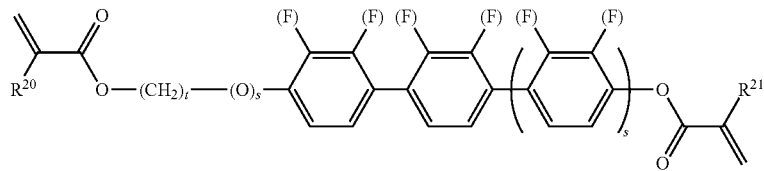
(M-2)
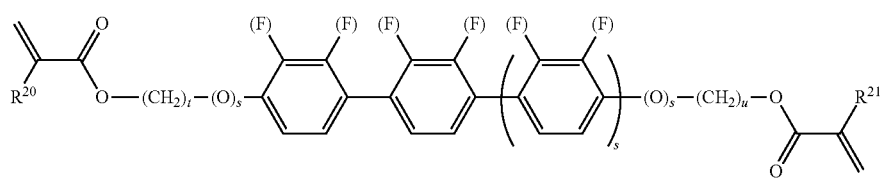
(M-3)
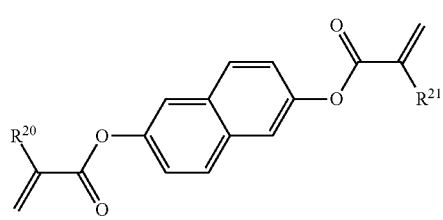
(M-4)
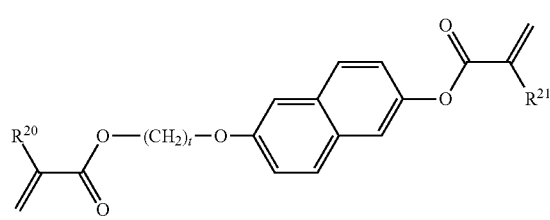
(M-5)
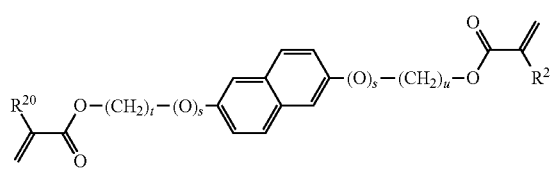
(M-6)
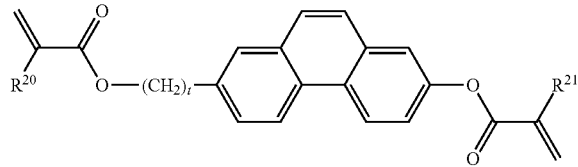
(M-7)
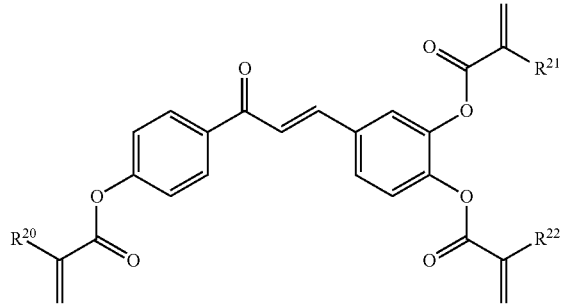
(M-8)
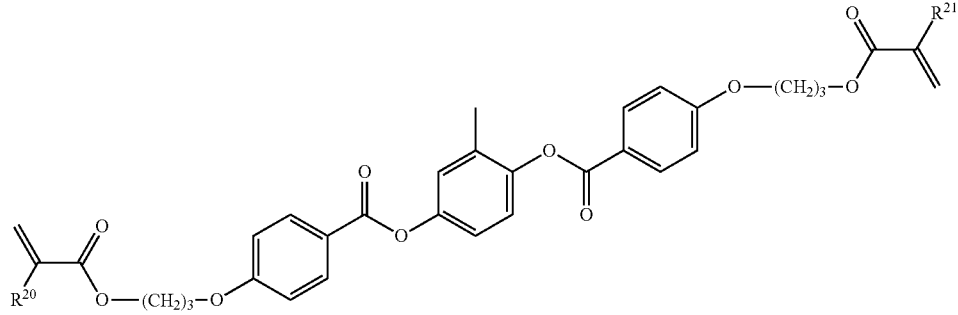
(M-9)
(M-10)

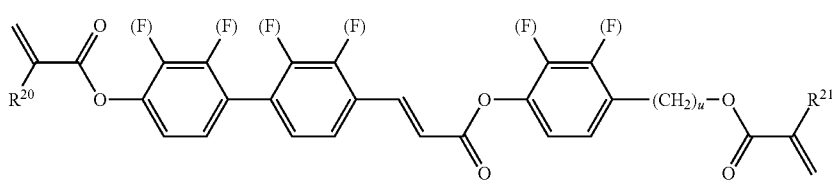

(M-11)

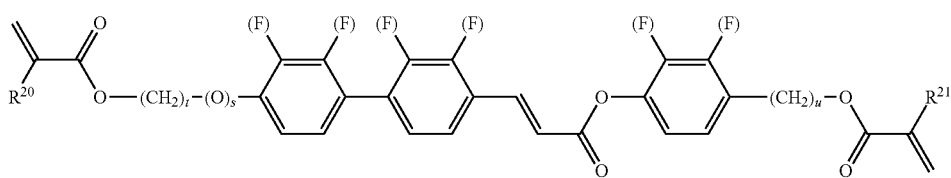

(M-12)

A desirable proportion of the polymerizable compound is about 0.03 wt % or more for achieving the effect, and is about 10 wt % or less for preventing a poor display. A more desirable proportion is in the range of about 0.1 wt % to about 2 wt %.

The polymerizable compound is polymerized by irradiation with UV light or the like, preferably in the presence of a suitable initiator such as a photopolymerization initiator. Suitable conditions for polymerization, a suitable type of the initiator and a suitable amount are known to persons of ordinary skill in the art and are described in the literature. For example, Irgacure 651, Irgacure 184 or Darocure 1173 that is commercially available from BASF is a photoinitiator, and is suitable for radical polymerization. The proportion of the photopolymerization initiator is desirably in the range of about 0.1 wt % to about 5 wt % and more desirably in the range of about 1 wt % to about 3 wt % based on the polymerizable compound.

A liquid crystal composition including a polymerizable compound is arranged between two substrates of a liquid crystal display device, and then the polymerizable compound may be polymerized while a voltage is applied between opposite electrodes of these substrates. It is also possible to dispose, between the two substrates of a liquid crystal display device, a liquid crystal composition that includes a compound having been polymerized in advance.

Examples of a polymerization inhibitor include hydroquinone derivatives such as hydroquinone or methylhydroquinone, 4-tert-butylcatechol, 4-methoxyphenol and phenothiazine.

An optically active compound is effective in inducing a helical structure in liquid crystal molecules and giving a required twist angle, and thus preventing a reverse twist. The helical pitch can be adjusted by addition of the optically active compound. Two or more optically active compounds may be added for the purpose of adjusting the temperature dependence of the helical pitch. Desirable examples of the optically active compound include compounds (Op-1) to (Op-18) described below. In compound (Op-18), ring J is 1,4-cyclohexylene or 1,4-phenylene, $R^{24}$ is alkyl having 1 to 10 carbons. The desirable proportion of the optically active compound is about 5 wt % or less. The more desirable proportion is in the range of about 0.01 wt % to about 2 wt %.

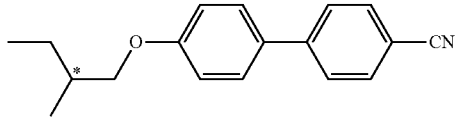

(Op-1)

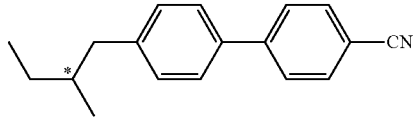

(Op-2)

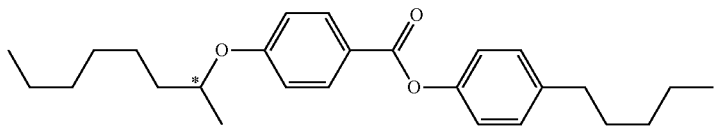

(Op-3)

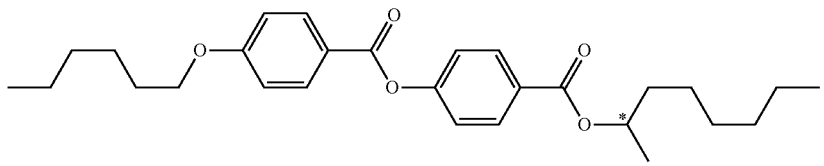

(Op-4)

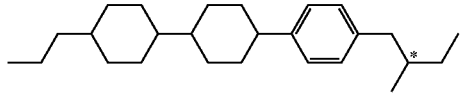

(Op-5)

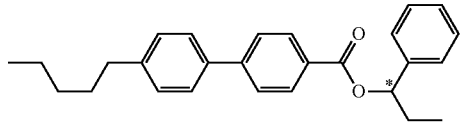

(Op-6)

-continued
(Op-7)
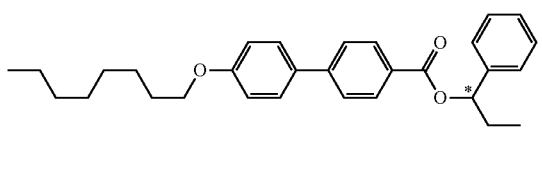
(Op-8)
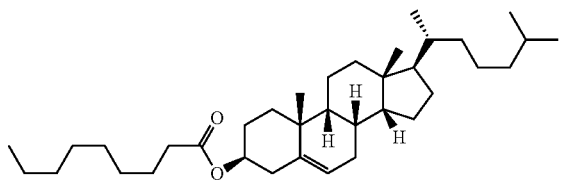
(Op-9)
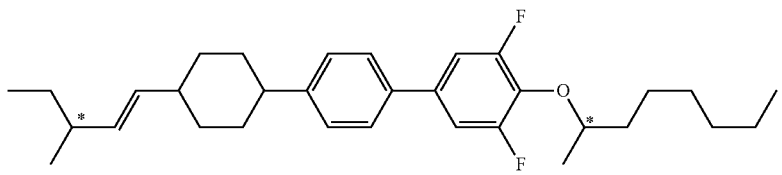
(Op-10)
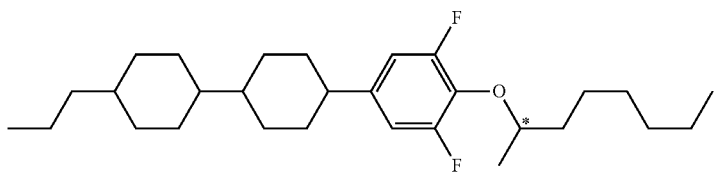
(Op-11)
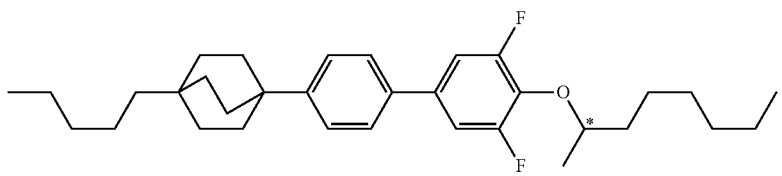
(Op-12)
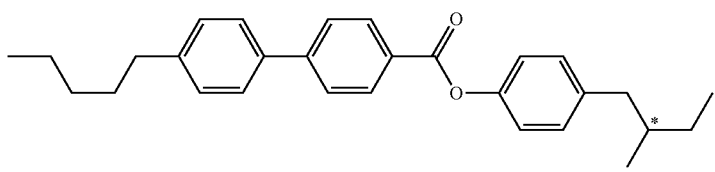
(Op-13)
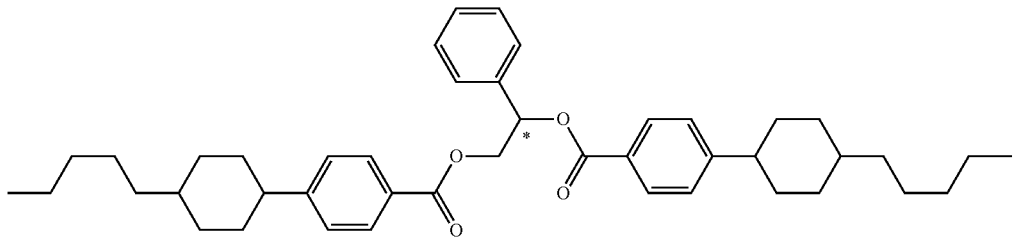
(Op-14)
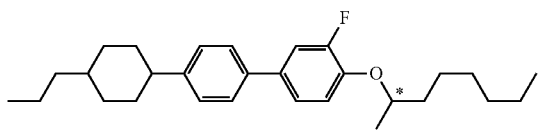
(Op-15)
(Op-16)
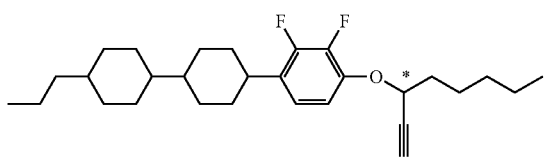
(Op-17)
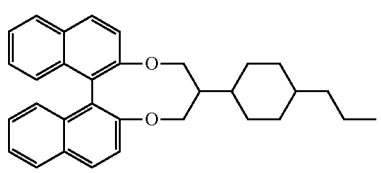

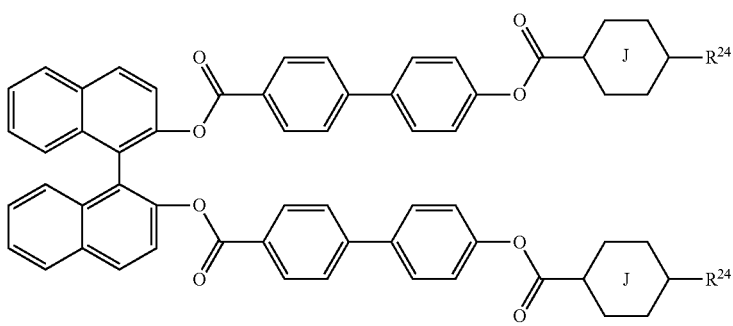

(Op-18)

An antioxidant is effective in maintaining a large voltage holding ratio. Compound (1) is the most desirable since it has a high solubility in a liquid crystal composition. Compound (1) may be combined with any other antioxidant. Desirable examples of any other antioxidant include compounds (AO-1) and (AO-2) described below, and Irganox 415, Irganox 565, Irganox 1010, Irganox 1035, Irganox 3114 and Irganox 1098 that are commercially available from BASF. Compound (AO-1) with $R^{25}$ being —$CH_3$ is effective in preventing a decrease in the specific resistance that is caused by heating under air, since it has a large volatility. Compound (AO-1) with $R^{25}$ being —$C_7H_{15}$ is effective in maintaining a large voltage holding ratio at room temperature and also at a temperature close to the maximum temperature of a nematic phase even after the device has been used for a long time, since it has a small volatility. A desirable proportion of the antioxidant is about 50 ppm or more for achieving the effect, and is about 600 ppm or less for preventing a decrease in the maximum temperature or preventing an increase in the minimum temperature. The more desirable proportion is in the range of about 100 ppm to about 300 ppm.

A UV light absorbent is effective in preventing a decrease in the maximum temperature. Desirable examples of the UV light absorbent include a benzophenone derivative, a benzoate derivative and a triazole derivative. Specific examples include compounds (AO-3) and (AO-4) described below, Tinuvin 329, Tinuvin P, Tinuvin 326, Tinuvin 234, Tinuvin 213, Tinuvin 400, Tinuvin 328 and Tinuvin 99-2 that are commercially available from BASF, and 1,4-diazabicyclo[2.2.2]octane (DABCO). A light stabilizer such as an amine having steric hindrance is also desirable for maintaining a large voltage holding ratio. Desirable examples of the light stabilizer include compounds (AO-5) and (AO-6) described below, and Tinuvin 144, Tinuvin 765 and Tinuvin 770DF that are commercially available from BASF. A desirable proportion of these absorbers and stabilizers is about 50 ppm or more for achieving the effect, and is about 10,000 ppm or less for preventing a decrease in the maximum temperature or for preventing an increase in the minimum temperature. A more desirable proportion is in the range of about 100 ppm to about 10,000 ppm.

A thermal stabilizer is also effective in maintaining a large voltage holding ratio. Desirable examples include Irgafos 168 (trade name, from BASF). An antifoaming agent is effective for preventing foam formation, and desirable examples thereof include dimethyl silicone oil and methyl phenyl silicone oil. A desirable proportion of the antifoaming agent is about 1 ppm or more for achieving the effect, and is about 1,000 ppm or less for preventing a poor display. A more desirable proportion is in the range of about 1 ppm to about 500 ppm.

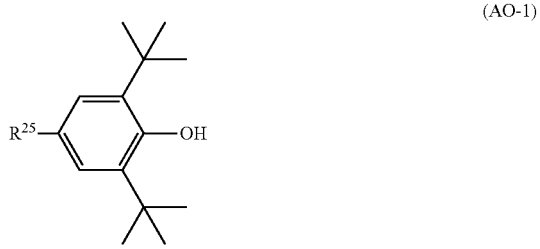

(AO-1)

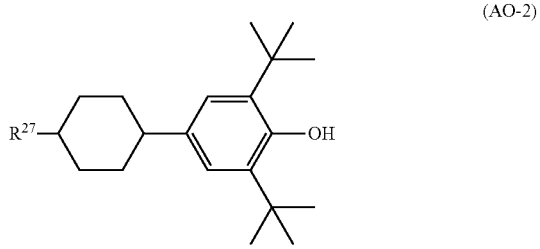

(AO-2)

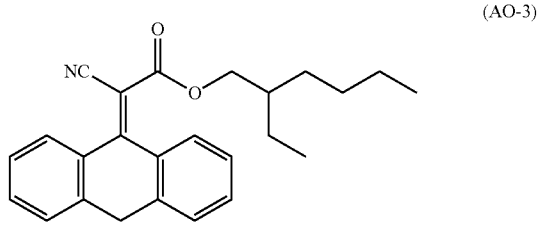

(AO-3)

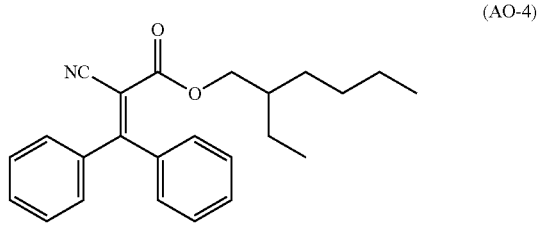

(AO-4)

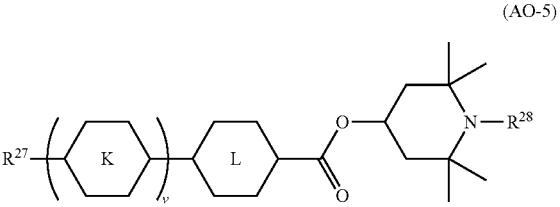

(AO-5)

-continued (AO-6)

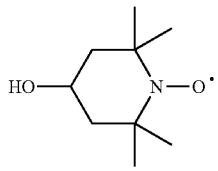

In compound (AO-1), $R^{25}$ is alkyl having 1 to 20 carbons, alkoxy having 1 to 20 carbons, —COOR$^{26}$ or —CH$_2$CH$_2$COOR$^{26}$, wherein $R^{26}$ is alkyl having 1 to 20 carbons. In compounds (AO-2) and (AO-5), $R^{27}$ is alkyl having 1 to 20 carbons. In compound (AO-5), ring K and ring L are independently 1,4-cyclohexylene or 1,4-phenylene; v is 0, 1 or 2; and $R^{28}$ is hydrogen, methyl or O. (oxygen radical).

A dichroic dye such as an azo dye or an anthraquinone dye is mixed in the composition for adaption to a device having a guest host (GH) mode. The desirable proportion of the pigment is in the range of about 0.01 wt % to about 10 wt %.

Seventh, methods for synthesizing the component compounds are explained. Compound (1) can be synthesized by a suitable combination of techniques in synthetic organic chemistry. Compound (1) can be synthesized, for example, in accordance with the following reaction formulas (a) to (d). A starting material, Trolox (trade name), is commercially available from Tokyo Chemical Industry Co., Ltd.

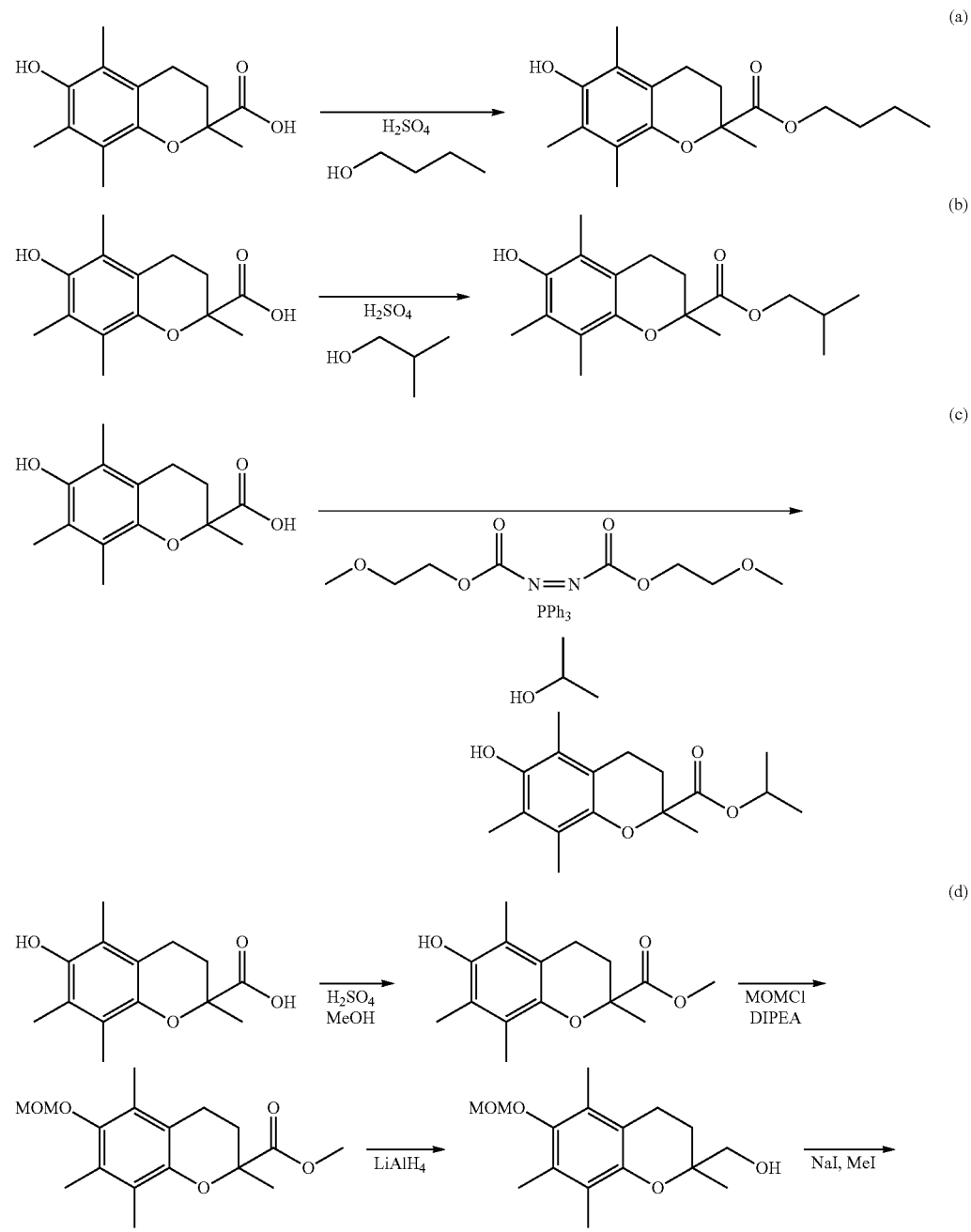

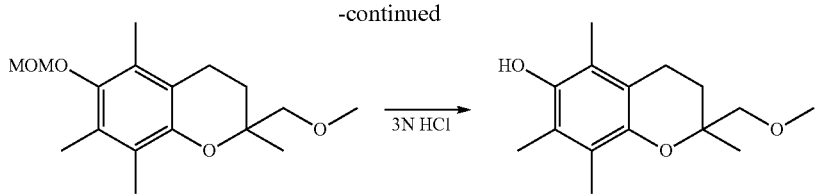

Compounds (2) to (4) can be prepared by known methods. The synthetic methods are exemplified as follows. Compounds (2-1-1) and (2-5-1) are prepared by the method described in JP S59-176221 A (1984). Compounds (3-3-1), (3-6-2), (3-7-1) and (3-10-1) are prepared by the method described in JP H10-251186 A (1998). Compounds (3-14-1) and (3-16-1) are prepared by the method described in JP H02-233626 A (1990). Compound (4-1-1) is prepared by the method in JP 2000-053602 A (2000).

Compounds whose synthetic methods are not described above can be prepared according to the methods described in books such as "Organic Syntheses" (John Wiley & Sons, Inc.), "Organic Reactions" (John Wiley & Sons, Inc.), "Comprehensive Organic Synthesis" (Pergamon Press) and "Shin Jikken Kagaku Kouza" (New Experimental Chemistry Course, in English; Maruzen Co., Ltd.). The composition is prepared according to known methods using the compounds thus obtained. For example, the component compounds are mixed and dissolved in each other by heating.

Last, the use of the composition is explained. Most compositions have a minimum temperature of about −10° C. or lower, a maximum temperature of about 70° C. or higher, and an optical anisotropy in the range of about 0.07 to about 0.20. A device containing this composition has a large voltage holding ratio. This composition is suitable for an AM device. This composition is suitable especially for a transmission-type AM device. The composition having an optical anisotropy in the range of about 0.08 to about 0.25, and even a composition having an optical anisotropy in the range of about 0.10 to about 0.30 may be prepared by adjusting the proportions of the component compounds or by mixing with any other liquid crystal compound. This composition can be used as a composition having a nematic phase. This composition can be used as an optically active composition by adding an optically active compound.

This composition can be used for an AM device. This composition can also be used for a PM device. This composition can also be used for the AM device and PM device having a mode such as PC, TN, STN, ECB, OCB, IPS, FFS, VA or PSA. It is particularly desirable to use the composition for the AM device having a TN, OCB, IPS or FFS mode. In a AM device having the IPS mode or the FFS mode, the orientation of liquid crystal molecules may be parallel or perpendicular to a glass substrate when no voltage is applied. These devices may be of a reflection type, a transmission type or a semi-transmission type. It is desirable to use the composition for a transmission-type device. The composition is usable for an amorphous silicon-TFT device or a polycrystal silicon-TFT device. This composition can also be used for a nematic curvilinear aligned phase (NCAP) device prepared by microcapsulating the composition, and for a polymer dispersed (PD) device in which a 3D network-polymer is formed in the composition.

EXAMPLES

The invention will be explained below in more details by way of examples. However, the invention is not limited to the examples. The synthesized compounds were identified by means of proton nuclear magnetic resonance spectroscopy ($^1$H-NMR) and so forth. The melting point of a compound was determined by means of differential scanning calorimetry (DSC). The analytical methods will be explained first.

$^1$H-NMR Analysis:

Model DRX-500 apparatus (made by Bruker BioSpin Corporation) was used for the measurement. A sample was dissolved in a deuterated solvent such as $CDCl_3$, and the measurement was carried out under the conditions of room temperature, 500 MHz and a accumulation of 24 scans. Tetramethylsilane (TMS) was used as an internal standard. In the explanation of the NMR spectra, the symbols s, d, t, q and m stand for a singlet, a doublet, a triplet, a quartet and a multiplet, respectively.

UV/Vis Analysis:

Model PharmaSpec UV-1700 apparatus made by Shimadzu Corporation was used for measurement. The wavelengths in the range of 190 nm to 700 nm were used for detection. A sample was dissolved in acetonitrile to prepare a 0.01 mmol/L solution, which was placed in a quartz cell (optical path length: 1 cm) and measured.

Differential Scanning Calorimetry:

A Perkin-Elmer differential scanning calorimeter, a DSC-7 System or a Diamond DSC System, was used for the measurement. A sample was heated and then cooled at the rate of 3° C./min. The starting point of an endothermic peak or an exothermic peak caused by a phase change of the sample was obtained through extrapolation to determine the melting point.

HPLC Analysis:

Model Prominence (LC-20AD; SPD-20A) apparatus made by Shimadzu Corporation was used for the measurement. A column YMC-Pack ODS-A (length 150 mm, bore 4.6 mm, particle size 5 μm) made by YMC Co., Ltd. was used. An acetonitrile/water mixture (80/20 by volume) was used as an eluent, and the flow rate was adjusted to 1 mL/min. A UV detector, a RI detector, a Corona detector and so forth were suitably used as a detector. The wavelength for detection was 254 nm when the UV detector was used. A sample was dissolved in acetonitrile, and 1 μL of this solution (0.1 wt %) was injected into the sample injector. Model C-R7Aplus made by Shimadzu Corporation was used as a recorder. The resulting chromatogram showed the retention time of peaks and the peak areas corresponding to the component compounds.

The ratio of the peak areas in the chromatogram of the HPLC corresponds to the ratio of component compounds. In general, the weight percentage of each component compound is not the same as the percentage of each peak area. However, the weight percentage by of the component compound may be calculated from the percentage of each peak area when the columns described above are used. This is because there is no significant difference between the correction coefficients of the component compounds in the invention.

Gas Chromatographic Analysis:

A gas chromatograph Model GC-2014 made by Shimadzu Corporation was used for the analysis. The carrier gas was helium (2 mL/min). The sample injector and the detector (FID) were set to 280° C. and 300° C., respectively. A capillary column DB-1 (length 30 meters, bore 0.32 millimeter, film thickness 0.25 micrometer, dimethylpolysiloxane as the stationary phase, non-polar) made by Agilent Technologies, Inc. was used for the separation of component compounds. After the column had been kept at 200° C. for 2 minutes, it was further heated to 280° C. at the rate of 5° C./min. A sample was dissolved in acetone (0.1 wt %), and 1 μL of the solution was injected into the sample injector. The recorder was a Model C-R5A Chromatopac Integrator made by Shimadzu Corporation or its equivalent. The resulting gas chromatogram showed the retention time of peaks and the peak areas corresponding to the component compounds.

Chloroform, hexane and so forth may also be used as solvents to dilute the sample. The following capillary columns may also be used in order to separate the component compounds: HP-1 made by Agilent Technologies Inc. (length 30 meters, bore 0.32 mm, film thickness 0.25 μm), Rtx-1 made by Restek Corporation (length 30 meters, bore 0.32 mm, film thickness 0.25 μm), and BP-1 made by SGE International Pty. Ltd. (length 30 meters, bore 0.32 mm, film thickness 0.25 μm). A capillary column CBP1-M50-025 (length 50 meters, bore 0.25 mm, film thickness 0.25 μm) made by Shimadzu Corporation may also be used for the purpose of avoiding an overlap of peaks of the compounds.

The ratio of liquid crystal compounds included in a composition was calculated according to the following method. The liquid crystal compounds could be detected by means of a gas chromatograph. The ratio of peak areas in the gas chromatogram corresponds to the ratio (molar ratio) of the liquid crystal compounds. When the above capillary columns are used, the correction coefficient of respective liquid crystal compounds may be regarded as 1 (one). Accordingly, the proportions (weight percentages) of the liquid crystal compounds can be calculated from the ratio of peak areas.

Example 1

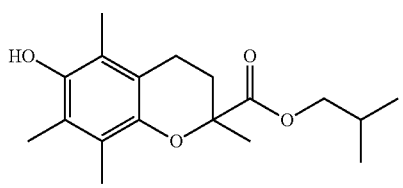

(1-1-1-3)

Compound (1-1-1-3) was prepared as follows. A mixture of 6-hydroxy-2,5,7,8-tetramethylchroman-2-carboxylic acid (1.00 g), concentrated sulfuric acid (0.55 g) and isobutanol (10 ml) was stirred at 80° C. for 5 hours. After the reaction mixture was cooled, water was added and the mixture was extracted with ethyl acetate. The organic layer was washed with a saturated aqueous solution of sodium hydrogencarbonate and water, and dried over anhydrous magnesium sulfate. The solvent was distilled off, and the residue was purified by silica gel column chromatography (eluent: toluene) and then recrystallized from heptane to give the isobutyl ester (1.00 g), of which the melting point was 86.1° C.

Proton NMR (δ ppm; CDCl$_3$): 0.80 (dd, 6H), 1.60 (s, 3H), 1.78-1.89 (m, 1H), 2.05 (s, 3H), 2.15 (s, 3H), 2.18 (s, 3H), 2.41-2.46 (m, 1H), 2.48-2.53 (m, 1H), 2.61-2.67 (m, 1H), 3.77-3.81 (m, 1H), 3.85-3.88 (m, 1H), 4.20 (s, 1H).

Example 2

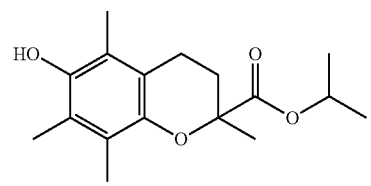

(1-1-1-4)

Compound (1-1-1-4) was prepared as follows. Bis(2-methoxyethyl) azodicarboxylate (1.22 g) in tetrahydropyran (20 ml) solution was added dropwise to a mixture of 6-hydroxy-2,5,7,8-tetramethylchroman-2-carboxylic acid (1.00 g), triphenylphosphine (1.36 g), isopropanol (0.36 ml) and tetrahydropyran (20 ml) at 5° C., and the mixture was returned to room temperature and stirred for 5 hours. Water was added to the reaction mixture, and the mixture was extracted with ethyl acetate. The organic layer was washed with a saturated aqueous solution of sodium hydrogencarbonate and water, and dried over anhydrous magnesium sulfate. The solvent was distilled off, and the residue was purified by silica gel column chromatography (eluent: toluene/ethyl acetate=9/1 in volume ratio) and then recrystallized twice from heptane to give the isopropyl ester (0.49 g), of which the melting point was 120.5° C.

Proton NMR δ ppm; CDCl$_3$): 0.07 (d, 3H), 1.19 (d, 3H), 1.58 (s, 3H), 1.82-1.88 (m, 1H), 2.05 (s, 3H), 2.15 (s, 3H), 2.18 (s, 3H), 2.39-2.43 (m, 1H), 2.48-2.55 (m, 1H), 2.61-2.66 (m, 1H), 4.22 (s, 1H), 4.91-4.96 (m, 1H).

Example 3

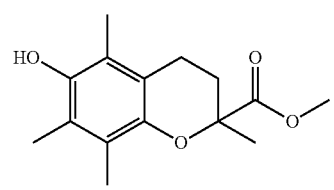

(1-1-1-2)

Compound (1-1-1-2) was prepared as follows. A mixture of 6-hydroxy-2,5,7,8-tetramethylchroman-2-carboxylic acid (1 g), concentrated sulfuric acid (0.55 g) and methanol (10 ml) was refluxed for 5 hours. After the reaction mixture was cooled, water was added and the mixture was extracted with ethyl acetate. The organic layer was washed with a saturated aqueous solution of sodium hydrogencarbonate and water, and dried over anhydrous magnesium sulfate. The solvent was distilled off, and the residue was purified by silica gel column chromatography (eluent: toluene/ethyl acetate=9/1 in volume ratio) and then recrystallized from heptane to give the methyl ester (0.95 g), of which the melting point was 155° C.

Proton NMR (δ ppm; CDCl₃): 1.59 (t, 3H), 1.83-1.89 (m, 1H), 2.06 (s, 3H), 2.15 (s, 3H), 2.18 (s, 3H), 2.40-2.45 (m, 1H), 2.48-2.55 (m, 1H), 2.61-2.66 (m, 1H), 3.66 (s, 3H), 4.24 (s, 1H).

Example 4

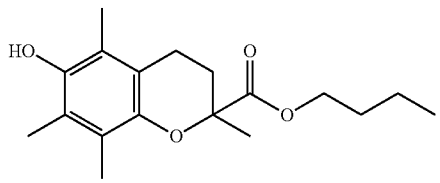

(1-1-1-1)

Compound (1-1-1-1) was prepared as follows. A mixture of 6-hydroxy-2,5,7,8-tetramethylchroman-2-carboxylic acid (1 g), concentrated sulfuric acid (0.55 g) and butanol (10 ml) was stirred at 80° C. for 5 hours. After the reaction mixture was cooled, water was added, and the mixture was extracted with ethyl acetate. The organic layer was washed with a saturated aqueous solution of sodium hydrogencarbonate and water, and dried over anhydrous magnesium sulfate. The solvent was distilled off, and the residue was purified by silica gel column chromatography (eluent: toluene) and then recrystallized from heptane to give the butyl ester (1.14 g), of which the melting point was 107.9° C.

Proton NMR (δ ppm; CDCl₃): 0.83 (t, 3H), 1.17-1.24 (m, 2H), 1.47-1.55 (m, 2H), 1.59 (s, 3H), 1.83-1.89 (m, 1H), 2.05 (s, 3H), 2.15 (s, 3H), 2.18 (s, 3H), 2.40-2.45 (m, 1H), 2.48-2.55 (m, 1H), 2.61-2.66 (m, 1H), 3.99-4.09 (m, 2H), 4.20 (s, 1H).

Example 5

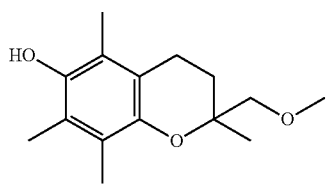

(1-2-1-1)

Compound (1-2-1-1) was prepared as follows. Compound (1-1-1-2) (8 g) was dissolved in dichloromethane (80 ml). The solution was cooled to 0° C. with ice, N,N-diisopropylethylamine (6 ml) was added, and then chloromethyl methyl ether (2.5 ml) was added. After 6 hours of stirring, water was added and the mixture was extracted with toluene. The organic layer was washed with water and dried over anhydrous magnesium sulfate. The solvent was distilled off, and the residue was purified by silica gel column chromatography (eluent: toluene/ethyl acetate=9/1 in volume ratio) to give the methoxymethyl derivative (9 g).

LAH (0.7 g) was dissolved in THF (90 ml) and the solution was cooled to −10° C. The methoxymethyl derivative (9 g) in THF solution was added dropwise. After 5 hours of stirring, ethyl acetate was added dropwise. Aqueous solution of ammonium chloride was added and the mixture was extracted with ethyl acetate. The organic layer was washed with water and dried over anhydrous magnesium sulfate. The solvent was distilled off, and the residue was purified by silica gel column chromatography (eluent: toluene/ethyl acetate=9/1 in volume ratio) to give the alcohol (8 g).

The alcohol (8 g) was dissolved in THF (80 ml), and the solution was cooled to 0° C. with ice. Sodium hydride (1.5 g) was added and the stirring was continued for 1 hour. Methyl iodide (4.8 g) was added and the stirring was continued for 4 hours. Aqueous solution of ammonium chloride was added and the mixture was extracted with ethyl acetate. The organic layer was washed with water and dried over anhydrous magnesium sulfate. The solvent was distilled off, and the residue was purified by silica gel column chromatography (eluent: toluene/ethyl acetate=19/1 in volume ratio) to give the ether (8 g).

The ether (8 g) was dissolved in THF (80 ml), and 3N—HCl (10 ml) was added. The mixture was stirred at room temperature for 24 hours. After the reaction was completed, water was added and the mixture was extracted with ethyl acetate. The organic layer was washed with a saturated aqueous solution of sodium hydrogencarbonate and water, and dried over anhydrous magnesium sulfate. The solvent was distilled off, and the residue was purified by silica gel column chromatography (eluent: toluene/ethyl acetate=9/1 in volume ratio) and then recrystallized from heptane to give alcohol (1-2-1-1) (7 g), of which the melting point was 101.0° C.

Proton NMR (δ ppm; CDCl₃): 1.26 (t, 3H), 1.72-1.77 (m, 1H), 1.93-1.99 (m, 1H), 2.10 (s, 3H), 2.11 (s, 3H), 2.15 (s, 3H), 2.61 (t, 2H), 3.34-3.45 (m, 2H), 3.41 (s, 3H), 4.20 (s, 1H).

Sample for Measurement:

When characteristics such as the maximum temperature of a liquid crystal compound was measured, this compound was mixed with a mother liquid crystal to prepare a sample for measurement. The mother liquid crystals (A) described below was used when the dielectric anisotropy of the compound was zero or positive. The proportion of each component was expressed as a weight percentage. In contrast, a liquid crystal composition was measured by itself.

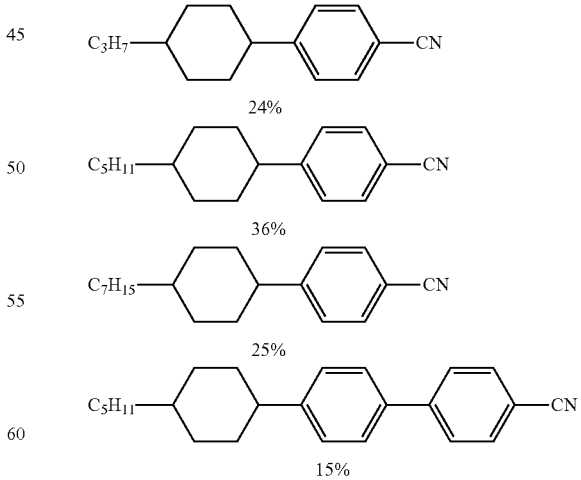

The mother liquid crystals (B) described below was used when the dielectric anisotropy of the compound was zero or negative. The proportion of each component was expressed as a weight percentage.

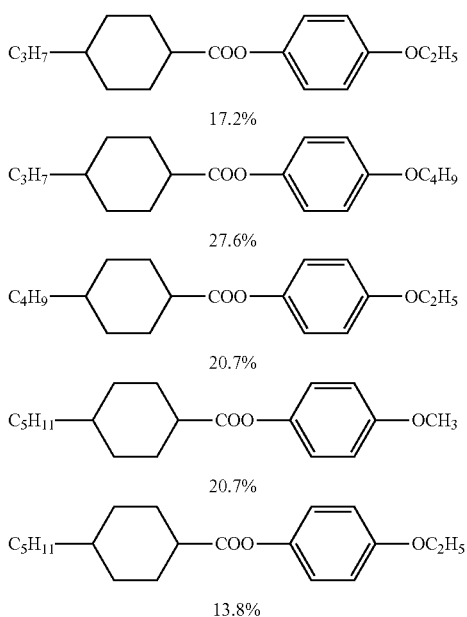

The characteristics were measured with the following methods. Most are methods described in the JEITA standards (JEITA-ED-2521B) which was deliberated and established by Japan Electronics and Information Technology Industries Association (abbreviated to JEITA), or the modified methods.

(1) Maximum Temperature of Nematic Phase (NI; ° C.):

A sample was placed on a hot plate in a melting point apparatus equipped with a polarizing microscope and was heated at a rate of 1° C./min. The temperature was measured when a part of the sample began to change from a nematic phase to an isotropic liquid. A higher limit of the temperature range of a nematic phase is sometimes abbreviated to "the maximum temperature."

(2) Minimum Temperature of Nematic Phase (Tc; ° C.):

A sample having a nematic phase was placed in glass vials and then kept in freezers at temperatures of 0° C., −10° C., −20° C., −30° C. and −40° C. for 10 days, and then the liquid crystal phase were observed. For example, when the sample maintained the nematic phase at −20° C. and changed to crystals or a smectic phase at −30° C., Tc was expressed as "<−20° C." The lower limit of the temperature range of a nematic phase is sometimes abbreviated to "the minimum temperature."

(3) Viscosity (Bulk Viscosity; η; Measured at 20° C.; mPa·s):

Viscosity was measured by use of an E-type viscometer made by Tokyo Keiki Inc.

(4) Viscosity (Rotational Viscosity; γ1; Measured at 25° C.; mPa·s): The measurement was carried out with the method described in M. Imai, et al., Molecular Crystals and Liquid Crystals, Vol. 259, (1995).

With regard to a composition having positive dielectric anisotropy, a sample was poured into a device in which the twist angle was 0° and the distance between the two glass substrates (cell gap) was 5 μm. A voltage with an increment of 0.5 volt in the range of 16 to 19.5 volts was applied stepwise to this device. After a period of 0.2 second with no voltage, a voltage was applied repeatedly under the conditions of only one rectangular wave (rectangular pulse; 0.2 second) and of no voltage (2 seconds). The peak current and the peak time of the transient current generated by the applied voltage were measured. The value of rotational viscosity was obtained from the measured values and the calculating equation (8) on page 40 of the paper of M. Imai, et al. The value of dielectric anisotropy necessary for this calculation was obtained by use of the device that had been used for the measurement of this rotational viscosity, according to the method described below.

With regard to a composition having negative dielectric anisotropy, a sample was poured into a VA device in which the distance between the two glass substrates (cell gap) was 20 μm. A voltage in the range of 39 V to 50 V was applied stepwise to this device with an increment of 1 volt. After a period of 0.2 second with no voltage, a voltage was applied repeatedly under the conditions of only one rectangular wave (rectangular pulse; 0.2 second) and no voltage (2 seconds). The value of the rotational viscosity was obtained with the procedure described the preceding paragraph.

(5) Optical Anisotropy (Refractive Index Anisotropy; an; Measured at 25° C.):

The measurement was carried out by use of an Abbe refractometer in which the ocular was equipped with a polarizing plate, using light at a wavelength of 589 nanometers. The surface of the main prism was rubbed in one direction, and then a sample was dropped on the main prism. The refractive index $n_\parallel$ was measured when the direction of polarized light was parallel to that of the rubbing. The refractive index $n_\perp$ was measured when the direction of polarized light was perpendicular to that of the rubbing. The value of optical anisotropy was calculated with the equation: $\Delta n = n_\parallel - n_\perp$.

(6) Dielectric Anisotropy (Δε; Measured at 25° C.):

The value of dielectric anisotropy was calculated with the equation: $\Delta\varepsilon = \varepsilon_\parallel - \varepsilon_\perp$. The dielectric constants $\varepsilon_\parallel$ and $\varepsilon_\perp$ were measured as follows.

With regard to a composition having positive dielectric anisotropy, a sample was poured into a TN device in which the distance between the two glass substrates (cell gap) was 9 μm and the twist angle was 80°. Sine waves (10 V, 1 kHz) were applied to this device, and the dielectric constant $\varepsilon_\parallel$ in the major axis direction of liquid crystal molecules was measured after 2 seconds. Sine waves (0.5 V, 1 kHz) were applied to this device, and the dielectric constant $\varepsilon_\perp$ in the minor axis direction of the liquid crystal molecules was measured after 2 seconds.

With regard to a composition having negative dielectric anisotropy, the measurement was as follows.
1) Measurement of the dielectric constant $\varepsilon_\parallel$: A solution of octadecyltriethoxysilane (0.16 mL) in ethanol (20 mL) was applied to a thoroughly cleaned glass substrate. The glass substrate was rotated with a spinner, and then heated at 150° C. for one hour. A sample was poured into a VA device in which the distance between the two glass substrates (cell gap) was 4 μm, and then this device was sealed with an adhesive curable with UV light. Sine waves (0.5 V, 1 kHz) were applied to this device, and the dielectric constant $\varepsilon_\parallel$ in the major axis direction of liquid crystal molecules was measured after 2 seconds.
2) Measurement of the dielectric constant $\varepsilon_\perp$: A polyimide solution was applied to a thoroughly cleaned glass substrate. The glass substrate was calcined, and then the resulting alignment film was subjected to rubbing. A sample was poured into a TN device in which the distance between the two glass substrates (cell gap) was 9 μm and the twist angle was 80°. Sine waves (0.5 V, 1 kHz) were applied to this device, and the dielectric constant $\varepsilon_\perp$ in the minor axis direction of liquid crystal molecules was measured after 2 seconds.

(7) Threshold Voltage (Vth; Measured at 25° C.; V):

An LCD evaluation system Model LCD-5100 made by Otsuka Electronics Co., Ltd. was used for the measurement. The light source was a halogen lamp.

With regard to a composition having positive dielectric anisotropy, a sample was poured into a TN device having a normally white mode, in which the distance between the two glass substrates (cell gap) was 0.45/Δn (μm) and the twist angle was 80°. The voltage applied to this device (32 Hz, rectangular waves) was stepwise increased in 0.02 V increments from 0 V up to 10 V. The device was simultaneously irradiated with light in the perpendicular direction, and the amount of light passing through the device was measured. A voltage-transmittance curve was plotted, in which the maximum amount of light corresponded to 100% transmittance and the minimum amount of light corresponded to 0% transmittance. The threshold voltage was expressed as the voltage at 90% transmittance.

With regard to a composition having negative dielectric anisotropy, the sample was poured into a VA device having a normally black mode, in which the distance between the two glass substrates (cell gap) was 4 μm and the rubbing direction was antiparallel. This device was sealed with an adhesive curable with UV light. The voltage applied to this device (60 Hz, rectangular waves) was increased stepwise from 0 V to 20 V in 0.02 V increments. The device was simultaneously irradiated with light in the perpendicular direction, and the amount of light passing through the device was measured. A voltage-transmittance curve was plotted, in which the maximum amount of light corresponded to 100% transmittance and the minimum amount of light corresponded to 0% transmittance. The threshold voltage was expressed as the voltage at 10% transmittance.

(8) Voltage Holding Ratio (VHR-i; 25° C.; %):

A TN device used for measurement had a polyimide-alignment film, and the distance between the two glass substrates (cell gap) was 5 μm. A sample was poured into the device, and then this device was sealed with an adhesive curable with UV light. A pulse voltage (60 microseconds at 5 V) was applied to this TN device to charge the device. The decaying voltage was measured for 16.7 milliseconds with a high-speed voltmeter, and area A between the voltage curve and the horizontal axis in a unit cycle was obtained. The voltage holding ratio was expressed as the percentage of area A to area B that was the area without decay.

(9) Voltage Holding Ratio (VHR-u; at 25° C.; %):

The stability to UV light was evaluated by measuring the voltage holding ratio after irradiation with UV light. A TN device used for the measurement had a polyimide-alignment film and the cell gap was 5 μm. A sample was injected into this device, and then the device was irradiated with light for 20 minutes. The light source was an ultra high-pressure mercury lamp USH-500D (made by Ushio, Inc.), and the distance between the device and the light source was 20 cm. In the measurement of VHR-u, the decaying voltage was measured for 16.7 milliseconds. A composition having a large VHR-u has a high stability to UV light. The value of VHR-u is preferably 90% or more, and more preferably 95% or more.

(10) Voltage Holding Ratio (VHR-h; at 25° C.; %):

A TN device to which a sample was injected was heated in a constant-temperature oven at 150° C. for 1 hour, and then the voltage holding ratio was measured and the stability to heat was evaluated. In the measurement of VHR-h, the decaying voltage was measured for 16.7 milliseconds. A composition having a large VHR-h has a large stability to heat.

(11) Response Time (τ; measured at 25° C.; millisecond):

An LCD evaluation system Model LCD-5100 made by Otsuka Electronics Co., Ltd. was used for the measurement. The light source was a halogen lamp. The low-pass filter was set at 5 kHz.

With regard to a composition having positive dielectric anisotropy, a sample was poured into a TN device having a normally white mode, in which the distance between the two glass substrates (cell gap) was 5.0 μm and the twist angle was 80°. Rectangular waves (60 Hz, 5 V, 0.5 second) were applied to this device. The device was simultaneously irradiated with light in the perpendicular direction, and the amount of light passing through the device was measured. The maximum amount of light corresponded to 100% transmittance, and the minimum amount of light corresponded to 0% transmittance. The rise time (τr; millisecond) was the time required for a change from 90% to 10% transmittance. The fall time (τf; millisecond) was the time required for a change from 10% to 90% transmittance. The response time was expressed as the sum of the rise time and the fall time thus obtained.

With regard to a composition having negative dielectric anisotropy, a sample was poured into a VA device having a normally black mode, in which the distance between the two glass substrates (cell gap) was 4 μm, and the rubbing direction was antiparallel, and then the device was sealed with a UV curable adhesive. Rectangular waves (60 Hz, 10 V, 0.5 second) were applied to this device. The device was simultaneously irradiated with light in the perpendicular direction, and the amount of light passing through the device was measured. The maximum amount of light corresponded to 100% transmittance, and the minimum amount of light corresponded to 0% transmittance. The response time was expressed as the time required for a change from 90% to 10% transmittance (fall time; millisecond).

(12) Elastic Constant (K; Measured at 25° C.; pN):

With regard to a composition having positive dielectric anisotropy, a LCR meter Model HP 4284-A made by Yokokawa Hewlett-Packard, Ltd was used for the measurement. A sample was poured into a homogeneous alignment device in which the distance between the two glass substrates (cell gap) was 20 μm. An electric charge of 0 volts to 200 volts was applied to this device, and the electrostatic capacity and the applied voltage were measured. The measured values of the electric capacity (C) and the applied voltage (V) were fitted to equations (2.98) and (2.101) in page 75 of "Ekisho Debaisu Handobukku" (Liquid crystal device handbook, in English; the Nikkan Kogyo Shimbun, Ltd.) and the values of K11 and K33 were obtained from equation (2.99). Next, the value of K22 was calculated from equation (3.18) in page 171 and the values of K11 and K33 thus obtained. The Elastic constant was expressed as the average of K11, K22 and K33.

(13) Elastic Constant (K11: Splay Elastic Constant and K33: Bend Elastic Constant; Measured at 25° C.; pN):

With regard to a composition having negative dielectric anisotropy, an Elastic Constant Measurement System Model EC-1 made by Toyo Corporation was used for the measurement. A sample was poured into a homeotropic device in which the distance between the two glass substrates (cell gap) was 20 μm. An electric charge of 20 volts to 0 volts was applied to this device, and the electrostatic capacity and the applied voltage were measured. The measured values of the electrostatic capacity (C) and the applied voltage (V) were fitted to equations (2.98) and (2.101) in page 75 of "Ekisho Debaisu Handobukku" (Liquid crystal device handbook, in English; the Nikkan Kogyo Shimbun, Ltd.) and the value of the elastic constant was obtained from equation (2.100).

(14) Specific Resistance (ρ; Measured at 25° C.; Ωcm):

A sample (1.0 mL) was injected into a vessel equipped with electrodes. A DC voltage (10 V) was applied to this vessel, and the DC current was measured after 10 seconds. The specific resistance was calculated from the following equation: (specific resistance)=[(voltage)×(electric capacity of vessel)]/[(DC current)×(dielectric constant in vacuum)].

(15) Helical Pitch (P; Measured at Room Temperature; Micrometer):

The helical pitch was measured with the wedge method. Seepage 196 of "Ekishou Binran" (Liquid Crystal Handbook, in English; Maruzen, Co., Ltd., 2000). After a sample was injected into a wedge-shaped cell and the cell had been allowed to stand at room temperature for 2 hours, the interval (d2-d1) of disclination lines was observed with a polarizing microscope (Nikon Corporation, Model MM-40/60 series). The helical pitch (P) was calculated from the following equation:

$$P=2\times(d2-d1)\times\tan\theta,$$

wherein θ was the angle of the wedge cell.

(16) ORAC Analysis (ORAC Value; μmolTE/g; TE: Trolox Equivalent):

Oxygen radical absorbance capacity was measured according to the method developed by the United States Department of Agriculture. The ORAC value was expressed as in micromoles of trolox equivalents per 1 gram sample.

In Comparative Examples and Examples of a liquid crystal composition, the compounds were expressed by of symbols according to the definition in the following Table 3. In Table 3, the configuration of 1,4-cyclohexylene is trans. A parenthesized number next to the symbol corresponds to the number of the compound. The symbol (-) means any other liquid crystal compound. The proportion (percentage) of a liquid crystal compound is expressed as a weight percentage (wt %) based on the weight of the liquid crystal composition including no additives. Last, the values of the characteristics of the composition were summarized.

TABLE 3

Method of Description of Compounds using Symbols $$R-(A_1)-Z_1-\ldots\ldots-Z_n-(A_n)-R'$$

| 1) Left-terminal Group R— | Symbol |
|---|---|
| $C_nH_{2n+1}-$ | n- |
| $C_nH_{2n+1}O-$ | nO— |
| $C_mH_{2m+1}OC_nH_{2n}-$ | mOn- |
| $CH_2=CH-$ | V— |
| $C_nH_{2n+1}-CH=CH-$ | nV— |
| $CH_2=CH-C_nH_{2n}-$ | Vn- |
| $C_mH_{2m+1}-CH=CH-C_nH_{2n}-$ | mVn- |
| $CF_2=CH-$ | VFF— |
| $CF_2=CH-C_nH_{2n}-$ | VFFn- |

| 2) Right-terminal Group —R' | Symbol |
|---|---|
| $-C_nH_{2n+1}$ | -n |
| $-OC_nH_{2n+1}$ | —On |
| $-CH=CH_2$ | —V |
| $-CH=CH-C_nH_{2n+1}$ | —Vn |
| $-C_nH_{2n}-CH=CH_2$ | -nV |
| $-C_mH_{2m}-CH=CH-C_nH_{2n+1}$ | -mVn |
| $-CH=CF_2$ | —VFF |
| —F | —F |
| —Cl | —CL |
| $-OCF_3$ | —OCF3 |
| $-CF_3$ | —CF3 |
| $-CF=CH-CF_3$ | —FVCF3 |
| $-CF=CF-CF_3$ | —FVFCF3 |

| 3) Bonding Group $-Z_n-$ | Symbol |
|---|---|
| $-C_nH_{2n}-$ | n |
| —COO— | E |
| —CH=CH— | V |
| $-CH_2O-$ | 1O |
| $-OCH_2-$ | O1 |
| $-CF_2O-$ | X |
| —C≡C— | T |

| 4) Bonding Group $-A_n-$ | Symbol |
|---|---|
| cyclohexylene | H |
| phenylene | B |
| fluorophenylene (F) | B(F) |

TABLE 3-continued
Method of Description of Compounds using Symbols
R—(A$_1$)—Z$_1$—. . . . .—Z$_n$—(A$_n$)—R'
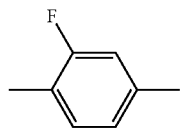 B(2F)
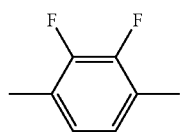 B(2F,3F)
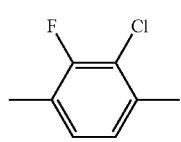 B(2F,3CL)
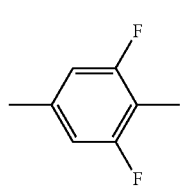 B(F,F)
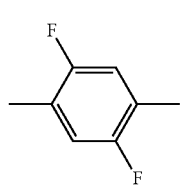 B(2F,5F)
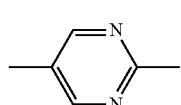 Py
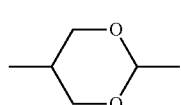 G
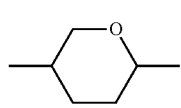 dh
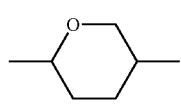 Dh
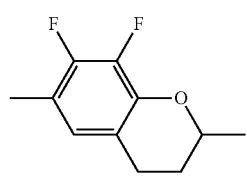 Cro(7F,8F)

TABLE 3-continued

Method of Description of Compounds using Symbols $$R—(A_1)—Z_1—.....—Z_n—(A_n)—R'$$

5) Examples of Description

Example 1. 3-HHB(2F,3F)—O2

Example 2. 3-BB(F)B(F,F)XB(F,F)—F

Example M1

Comparative Experiment 1

Liquid crystal composition (a) having positive dielectric anisotropy was prepared. The components and their proportions (wt %) were as follows. This composition was heated at 150° C. in air, and the maximum temperature (NI) was measured.

Liquid Crystal Composition (a):

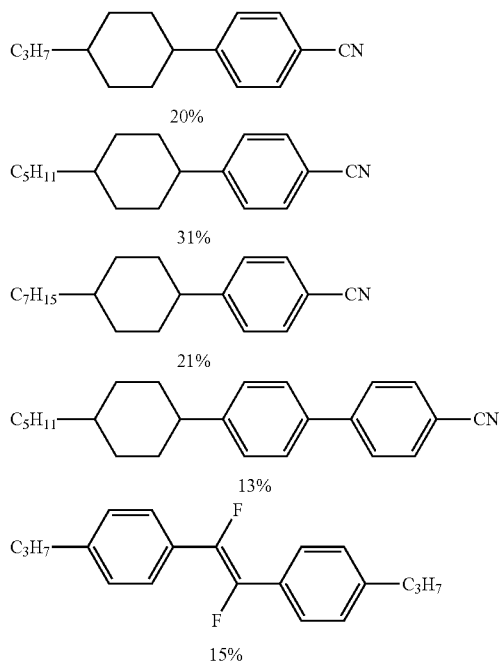

Compound (1-1-1-1) of the invention was added to liquid crystal composition (a) in a proportion of 0.05 wt %. This composition was also heated under the same conditions. Table 4 summarized the long-term change of the maximum temperature of the two composition. Table 4 shows that the maximum temperature did not decrease in the composition to which compound (1-1-1-1) was added, although the maximum temperature of composition (a) decreased with time. These results show that compound (1-1-1-1) is effective in preventing the deterioration of a composition.

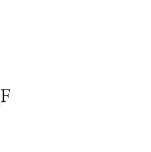

(1-1-1-1)

TABLE 4

| Long-term change of the maximum temperature (° C.) | | | | | |
|---|---|---|---|---|---|
| | Heating time at 150° C. | | | | |
| | 0 min | 5 min | 15 min | 30 min | 60 min |
| Composition (a) | 73.4 | 73.3 | 72.8 | 72.0 | 69.4 |
| Composition (a) + Compound (1-1-1-1) | 73.4 | 73.4 | 73.5 | 73.4 | 73.2 |

Example M2

Comparative Experiment-2

Liquid crystal composition (b) having negative dielectric anisotropy was prepared. The components and their proportions (wt %) were as follows.

Liquid Crystal Composition (b):

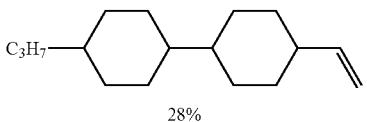

28%

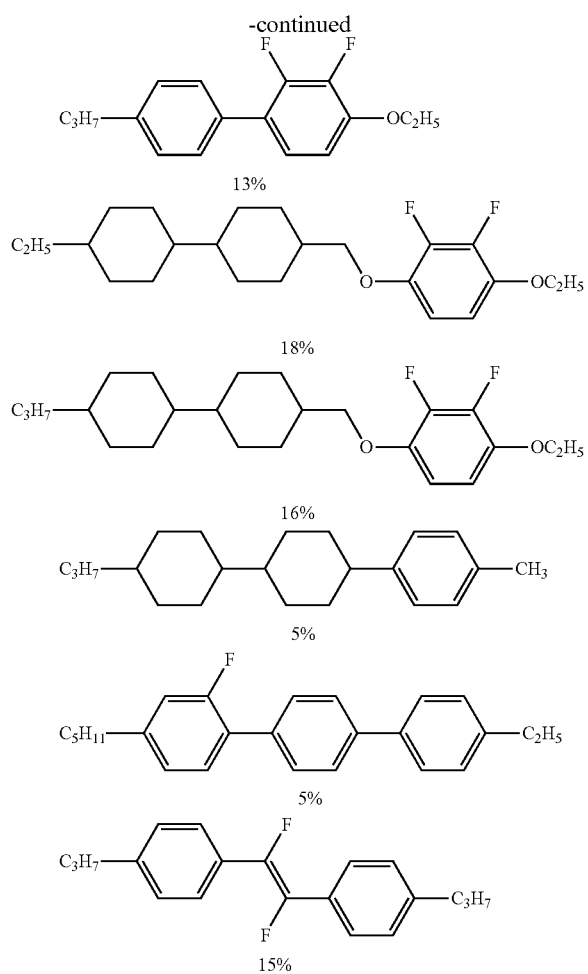

Compound (5-1) is an antioxidant and abbreviated to BHT. Compound (5-1) was added to liquid crystal composition (b) in a proportion of 0.05 wt %.

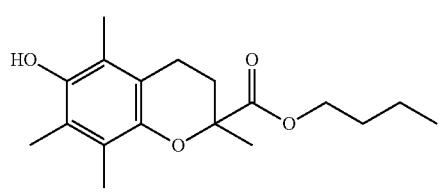

Compound (1-1-1-1) of the invention was added to liquid crystal composition (b) in a proportion of 0.05 wt %.

For three kinds of samples, which included liquid crystal composition (b), a composition prepared by adding compound (5-1) to liquid crystal composition (b), and a composition prepared by adding compound (1-1-1-1) to liquid crystal composition (b), the voltage holding ratios were measured according to the measurement methods (8) to (10) described above. VHR-i was measured in the initial conditions (untreated). VHR-u was measured after irradiation with UV light at 25° C. for 20 min. VHR-h was measured after heating at 150° C. for 1 hour. The results of the measurement are shown in Table 5. For liquid crystal composition (b) and in a composition prepared by the addition of compound (5-1) to liquid crystal composition (b), the voltage holding ratio was decreased by UV light or heat. The voltage holding ratio was largely decreased in the case of heating. In contrast, in a composition prepared by adding compound (1-1-1-1) to liquid crystal composition (b), there was no decrease caused by UV light. A decrease was 4.0% even in the case of heating. These results show that compound (1-1-1-1) is effective in preventing deterioration of the composition.

Accordingly, it is concluded from the results in Table 4 and Table 5 that the liquid crystal composition of the invention has a high stability to heat or UV light.

TABLE 5

| | Change of the voltage holding ratio (%) by ultraviolet irradiation and heating | | | |
| --- | --- | --- | --- | --- |
| | Ultraviolet irradiation | | Heating | |
| Sample | VHR-i | VHR-u | VHR-i | VHR-u |
| Composition (b) | 98.9 | 94.9 | 98.9 | 16.5 |
| Composition (b) + Compound (5-1) | 98.5 | 95.1 | 98.5 | 17.5 |
| Composition (b) + Compound (1-1-1-1) | 99.6 | 99.1 | 99.5 | 95.5 |

Example M3

| | | |
| --- | --- | --- |
| 3-HH-V | (2-1-1) | 46% |
| V-HHB-1 | (2-5-1) | 11% |
| 1-BB(F)B-2V | (2-8-1) | 7% |
| 2-BB(F)B-2V | (2-8-1) | 9% |
| 3-BB(F,F)XB(F,F)-F | (3-3-1) | 5% |
| 3-GB(F,F)XB(F,F)-F | (3-4-1) | 5% |
| 3-BB(F)B(F,F)XB(F,F)-F | (3-10-1) | 3% |
| 4-BB(F)B(F,F)XB(F,F)-F | (3-10-1) | 6% |
| 3-BB(F)B(F,F)XB(F)-F | (3-10-2) | 3% |
| 3-HBB-F | (3-14) | 5% |

Compound (1-1-1-1) was added to the preceding composition in a proportion of 0.05 wt %, and compound (1-1-1-2) was added in a proportion of 0.05 wt %.

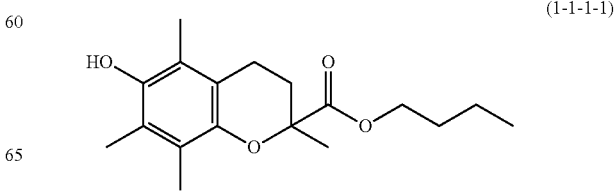

-continued

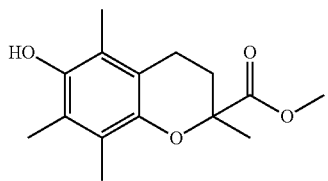

(1-1-1-2)

The characteristics of the composition after the addition were: NI=78.7° C.; Tc<−20° C.; Δε=4.3; Δn=0.118; η=13.4 mPa·s; Vth=2.11 V.

Example M4

| | | |
|---|---|---|
| 3-HH-V | (2-1-1) | 21% |
| 3-HB-O2 | (2-2-1) | 6% |
| V-HHB-1 | (2-5-1) | 7% |
| 2-BB(F)B-3 | (2-8-1) | 3% |
| 5-HBBH-3 | (2-11-1) | 5% |
| 5-HB(F)BH-3 | (2-12-1) | 3% |
| 5-HBB(F)B-2 | (2-13-1) | 4% |
| 5-HXB(F,F)-F | (3-1-1) | 5% |
| 3-BBXB(F,F)-F | (3-2-1) | 5% |
| 3-BB(F,F)XB(F,F)-F | (3-3-1) | 6% |
| 3-HHXB(F,F)-F | (3-5-1) | 8% |
| 4-HBB(F,F)XB(F,F)-F | (3-6-1) | 3% |
| 4-BB(F)B(F,F)XB(F,F)-F | (3-10-1) | 8% |
| 5-BB(F)B(F,F)XB(F,F)-F | (3-10-1) | 3% |
| 3-HBB(F,F)-F | (3-14-1) | 6% |
| 3-BB(F)B(F,F)-CF3 | (3-17-2) | 4% |
| 3-HHBB(F,F)-F | (3-18-1) | 3% |

Compound (1-1-1-2) was added to the preceding composition in a proportion of 0.05 wt %.

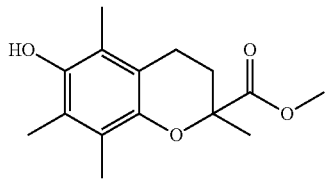

(1-1-1-2)

The characteristics of the composition after the addition were: NI=89.1° C.; Tc<−20° C.; Δε=7.8; Δn=0.116; η=15.3 mPa·s; Vth=1.88 V.

Example M5

| | | |
|---|---|---|
| 2-HH-3 | (2-1-1) | 19% |
| 3-HH-4 | (2-1-1) | 9% |
| 3-HHB-1 | (2-5-1) | 6% |
| 2-BB(F)B-5 | (2-8-1) | 3% |
| 5-HBB(F)B-2 | (2-13-1) | 6% |
| 5-HBB(F)B-3 | (2-13-1) | 6% |
| 3-BBXB(F,F)-F | (3-2-1) | 6% |
| 3-BB(F,F)XB(F,F)-F | (3-3-1) | 7% |
| 3-dhB(F)B(F,F)XB(F,F)-F | (3-9-1) | 3% |
| 4-BB(F)B(F,F)XB(F,F)-F | (3-10-1) | 4% |
| 3-HB-CL | (3-12-1) | 10% |
| 3-HHB-CL | (3-13) | 3% |
| 5-HHB-CL | (3-13) | 4% |
| 3-HBB(F,F)-F | (3-14-1) | 8% |
| 3-HHBB(F,F)-F | (3-18-1) | 3% |
| 4-HHBB(F,F)-F | (3-18-1) | 3% |

Compound (1-1-1-1) was added to the preceding composition in a proportion of 0.1 wt %.

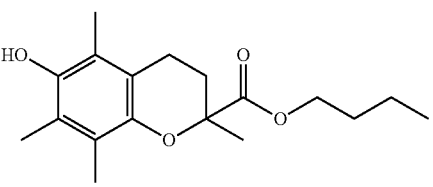

(1-1-1-1)

The characteristics of the composition after the addition were: NI=97.2° C.; Tc<−20° C.; Δε=5.7; Δn=0.121; η=15.5 mPa·s; Vth=2.25 V.

Example M6

| | | |
|---|---|---|
| 2-HH-5 | (2-1-1) | 8% |
| 3-HH-4 | (2-1-1) | 10% |
| 7-HB-1 | (2-2-1) | 5% |
| 5-HBB-2 | (2-6-1) | 5% |
| 3-HHEBH-3 | (2-9-1) | 5% |
| 3-BB(F,F)XB(F,F)-F | (3-3-1) | 14% |
| 3-HHXB(F,F)-CF3 | (3-5) | 5% |
| 3-HB-CL | (3-12-1) | 8% |
| 2-HHB(F,F)-F | (3-13-1) | 10% |
| 3-HHB-CL | (3-13) | 3% |
| 3-HHB-F | (3-13) | 4% |
| 3-HBB-F | (3-14) | 3% |
| 3-HBB(F)-F | (3-14) | 10% |
| 5-HBB(F)-F | (3-14) | 10% |

Compound (1-1-1-2) was added to the preceding composition in a proportion of 0.05 wt %.

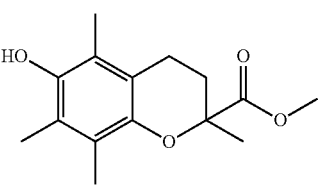

(1-1-1-2)

The characteristics of the composition after the addition were: NI=76.4° C.; Tc<−20° C.; Δε=6.2; Δn=0.096; η=18.1 mPa·s; Vth=1.84 V.

Example M7

| | | |
|---|---|---|
| 3-HH-V | (2-1-1) | 34% |
| 3-HH-V1 | (2-1-1) | 10% |
| 4-HH-V1 | (2-1-1) | 3% |
| 1V2-HHB-1 | (2-5-1) | 6% |
| 3-BB(F)B-5 | (2-8-1) | 5% |
| 1-BB(F)B-2V | (2-8-1) | 6% |
| 2-BB(F)B-2V | (2-8-1) | 7% |
| 3-BB(F,F)XB(F,F)-F | (3-3-1) | 13% |
| 3-BB(F,F)XB(F)-OCF3 | (3-3) | 3% |
| 4-HHB(F,F)XB(F,F)-F | (3-7-1) | 4% |
| 3-BB(F)B(F,F)XB(F,F)-F | (3-10-1) | 3% |
| 4-BB(F)B(F,F)XB(F,F)-F | (3-10-1) | 6% |

Compound (1-1-1-3) was added to the preceding composition in a proportion of 0.05 wt %.

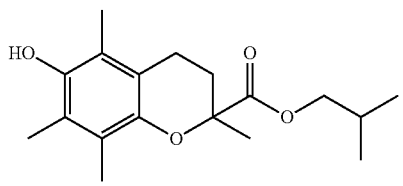

(1-1-1-3)

The characteristics of the composition after the addition were: NI=75.3° C.; Tc<−20° C.; Δε=5.3; Δn=0.119; η=13.4 mPa·s; Vth=1.95 V.

Example M8

| 3-HH-V | (2-1-1) | 18% |
| 5-HB-O2 | (2-2-1) | 5% |
| V2-BB-1 | (2-3-1) | 5% |
| V-HHB-1 | (2-5-1) | 14% |
| V2-HHB-1 | (2-5-1) | 5% |
| 5-B(F)BB-2 | (2-7-1) | 5% |
| 5-HBB(F)B-2 | (2-13-1) | 5% |
| 3-BB(F,F)XB(F,F)-F | (3-3-1) | 10% |
| 3-BB(F,F)XB(F)-OCF3 | (3-3) | 5% |
| 3-HHXB(F,F)-F | (3-5-1) | 7% |
| 4-BB(F)B(F,F)XB(F,F)-F | (3-10-1) | 5% |
| 4-BB(F,F)XB(F)B(F,F)-F | (3-11-1) | 4% |
| 3-HBB(F,F)-F | (3-14-1) | 3% |
| 3-GHB(F,F)-F | (3-15-1) | 5% |
| 3-HHBB(F,F)-F | (3-18-1) | 4% |

Compound (1-1-1-4) was added to the preceding composition in a proportion of 0.15 wt %.

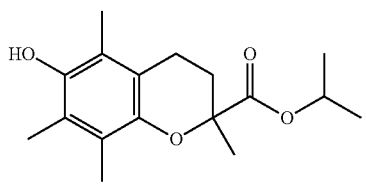

(1-1-1-4)

The characteristics of the composition after the addition were: NI=87.6° C.; Tc<−20° C.; Δε=8.5; Δn=0.125; η=16.5 mPa·s; Vth=1.80 V.

Example M9

| 3-HH-V | (2-1-1) | 32% |
| 1V2-BB-1 | (2-3-1) | 4% |
| 3-HHB-O1 | (2-5-1) | 4% |
| 2-BB(F)B-3 | (2-8-1) | 7% |
| 2-BB(F)B-5 | (2-8-1) | 8% |
| 3-BBXB(F,F)-F | (3-2-1) | 5% |
| 3-BB(F)B(F,F)XB(F)-F | (3-10-2) | 5% |
| 3-HBB(F)-F | (3-14) | 10% |
| 3-HHEB(F,F)-F | (3-16-1) | 10% |
| 4-HHEB(F,F)-F | (3-16-1) | 4% |
| 3-BB(F)B(F,F)-F | (3-17-1) | 6% |
| 1O1-HBBH-3 | (—) | 5% |

Compound (1-1-1-1) was added to the preceding composition in a proportion of 0.1 wt % and compound (5-7) was added in a proportion of 0.05 wt %.

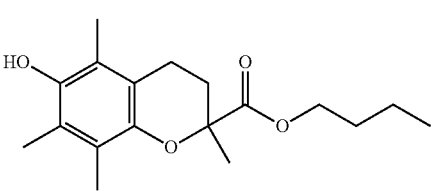

(1-1-1-1)

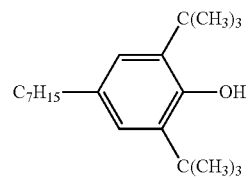

(5-7)

The characteristics of the composition after the addition were: NI=90.4° C.; Tc<−20° C.; Δε=4.2; Δn=0.128; η=13.1 mPa·s; Vth=2.45 V.

Example M10

| 3-HH-V | (2-1-1) | 37% |
| 3-HH-VFF | (2-1-1) | 8% |
| 3-HHEH-3 | (2-4-1) | 3% |
| 3-HHB-O1 | (2-5-1) | 3% |
| 2-BB(F)B-3 | (2-8-1) | 5% |
| 3-HB(F)HH-5 | (2-10-1) | 5% |
| 3-GB(F,F)XB(F,F)-F | (3-4-1) | 3% |
| 3-HBBXB(F,F)-F | (3-6-1) | 5% |
| 4-GB(F)B(F,F)XB(F,F)-F | (3-8-1) | 7% |
| 3-BB(F)B(F,F)XB(F)-F | (3-10-2) | 10% |
| 3-HHB(F)-F | (3-13) | 3% |
| 3-BB(F)B(F,F)-F | (3-17-1) | 8% |
| 3-HHBB(F,F)-F | (3-18-1) | 3% |

Compound (1-1-1-2) was added to the preceding composition in a proportion of 0.1 wt % and compound (5-7) was added in a proportion of 0.05 wt %.

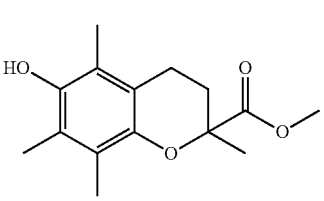

(1-1-1-2)

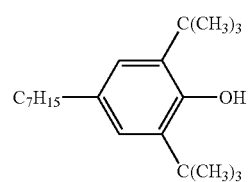

(5-7)

The characteristics of the composition after the addition were: NI=91.1° C.; Tc<−20° C.; Δε=7.2; Δn=0.109; η=15.2 mPa·s; Vth=2.00 V.

Example M11

| | | |
|---|---|---|
| V-HH-3 | (2-1-1) | 28% |
| 1-BB-3 | (2-3-1) | 5% |
| 3-HHB-1 | (2-5-1) | 3% |
| 3-HHB-3 | (2-5-1) | 3% |
| 5-B(F)BB-2 | (2-7-1) | 5% |
| 5-B(F)BB-3 | (2-7-1) | 3% |
| 3-BB(2F,3F)-O2 | (4-4-1) | 9% |
| 5-BB(2F,3F)-O2 | (4-4-1) | 4% |
| V-HHB(2F,3F)-O2 | (4-6-1) | 11% |
| 2-HH1OB(2F,3F)-O2 | (4-8-1) | 12% |
| 3-HH1OB(2F,3F)-O2 | (4-8-1) | 14% |
| 3-HDhB(2F,3F)-O2 | (4-11-1) | 3% |

Compound (1-1-1-1) was added to the preceding composition in a proportion of 0.1 wt %.

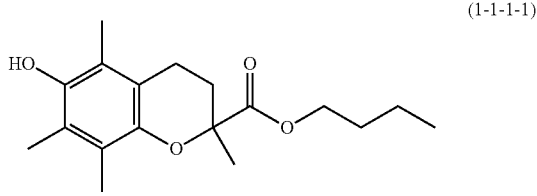 [SMILES: CCCCOC(=O)C1(C)CCc2c(C)c(O)c(C)c(C)c2O1]

(1-1-1-1)

The characteristics of the composition after the addition were: NI=83.6° C.; Tc<−20° C.; Δε=−3.3; Δn=0.108; η=17.7 mPa·s; Vth=2.31 V.

Example M12

| | | |
|---|---|---|
| 2-HH-3 | (2-1-1) | 25% |
| 3-HB-O2 | (2-2-1) | 8% |
| 3-HHEH-4 | (2-4-1) | 3% |
| 3-HHB-1 | (2-5-1) | 3% |
| V-HHB-1 | (2-5-1) | 5% |
| 3-HHEBH-3 | (2-9-1) | 4% |
| 3-HB(F)HH-5 | (2-10-1) | 3% |
| 3-H2B(2F,3F)-O2 | (4-2-1) | 15% |
| 5-H2B(2F,3F)-O2 | (4-2-1) | 7% |
| 3-HBB(2F,3F)-O2 | (4-13-1) | 8% |
| 4-HBB(2F,3F)-O2 | (4-13-1) | 8% |
| 3-dhBB(2F,3F)-O2 | (4-14-1) | 6% |
| 3-HH1OCro(7F,8F)-5 | (4-19-1) | 5% |

Compound (1-1-1-2) was added to the preceding composition in a proportion of 0.1 wt %.

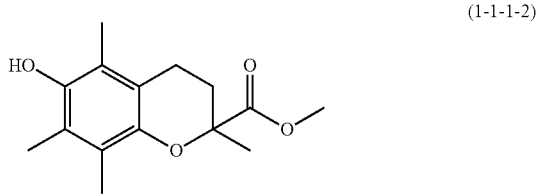 [SMILES: COC(=O)C1(C)CCc2c(C)c(O)c(C)c(C)c2O1]

(1-1-1-2)

The characteristics of the composition after the addition were: NI=85.1° C.; Tc<−20° C.; Δε=−3.1; Δn=0.093; η=20.4 mPa·s; Vth=2.46 V.

Example M13

| | | |
|---|---|---|
| V-HH-3 | (2-1-1) | 30% |
| VFF-HH-3 | (2-1-1) | 5% |
| V2-BB-1 | (2-3-1) | 5% |
| 1-BB(F)B-2V | (2-8-1) | 3% |
| 3-HB(2F,3F)-O2 | (4-1-1) | 11% |
| 3-H1OB(2F,3F)-O2 | (4-3-1) | 3% |
| 3-HHB(2F,3F)-O2 | (4-6-1) | 10% |
| 5-HHB(2F,3F)-O2 | (4-6-1) | 8% |
| 2-BB(2F,3F)B-3 | (4-9-1) | 6% |
| 3-HBB(2F,3F)-O2 | (4-13-1) | 10% |
| 4-HBB(2F,3F)-O2 | (4-13-1) | 4% |
| 5-HBB(2F,3F)-O2 | (4-13-1) | 5% |

Compound (1-1-1-3) was added to the preceding composition in a proportion of 0.1 wt %.

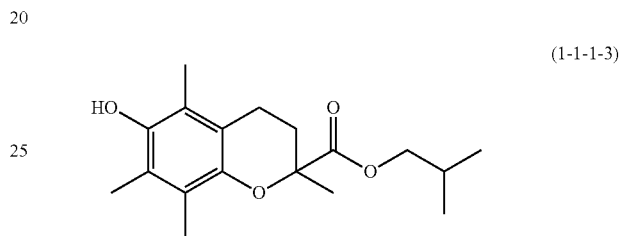

(1-1-1-3)

The characteristics of the composition after the addition were: NI=84.3° C.; Tc<−20° C.; Δε=−2.9; Δn=0.109; η=15.4 mPa·s; Vth=2.52 V.

Example M14

| | | |
|---|---|---|
| 3-HH-4 | (2-1-1) | 5% |
| 3-HH-O1 | (2-1-1) | 6% |
| V-HH-3 | (2-1-1) | 29% |
| 3-HHB-1 | (2-5-1) | 3% |
| 3-HHB-3 | (2-5-1) | 3% |
| 2-BB(F)B-3 | (2-8-1) | 7% |
| 3-HHEBH-3 | (2-9-1) | 4% |
| 3-HHEBH-4 | (2-9-1) | 3% |
| 3-H2B(2F,3F)-O2 | (4-2-1) | 12% |
| 5-H2B(2F,3F)-O2 | (4-2-1) | 8% |
| 3-HBB(2F,3F)-O2 | (4-13-1) | 10% |
| 4-HBB(2F,3F)-O2 | (4-13-1) | 5% |
| 3-HH1OCro(7F,8F)-5 | (4-19-1) | 5% |

Compound (1-1-1-1) was added to the preceding composition in a proportion of 0.05 wt %.

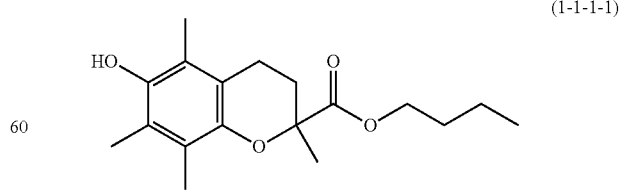

(1-1-1-1)

The characteristics of the composition after the addition were: NI=79.7° C.; Tc<−20° C.; Δε=−2.3; Δn=0.094; η=15.1 mPa·s; Vth=2.62 V.

Example M15

| | | |
|---|---|---|
| 2-HH-3 | (2-1-1) | 24% |
| 1V-HH-3 | (2-1-1) | 6% |
| 5-HB-O2 | (2-2-1) | 7% |
| 3-HHB-1 | (2-5-1) | 3% |
| 3-HBB-2 | (2-6-1) | 3% |
| 3-HB(F)HH-5 | (2-10-1) | 3% |
| 5-HBB(F)B-2 | (2-13-1) | 4% |
| 3-HB(2F,3F)-O2 | (4-1-1) | 15% |
| 5-HB(2F,3F)-O2 | (4-1-1) | 9% |
| 2O-B(2F,3F)B(2F,3F)-O6 | (4-5-1) | 3% |
| 3-DhHB(2F,3F)-O2 | (4-10-1) | 3% |
| 3-HBB(2F,3F)-O2 | (4-13-1) | 10% |
| 4-HBB(2F,3F)-O2 | (4-13-1) | 5% |
| 5-HBB(2F,3F)-O2 | (4-13-1) | 5% |

Compound (1-1-1-2) was added to the preceding composition in a proportion of 0.05 wt % and compound (1-1-1-3) was added in a proportion of 0.05 wt %.

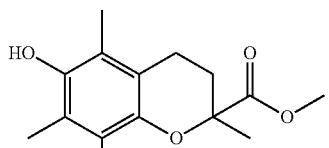

(1-1-1-2)

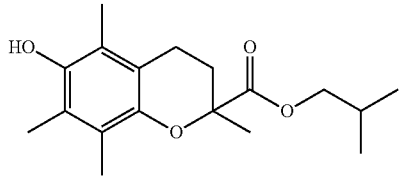

(1-1-1-3)

The characteristics of the composition after the addition were: NI=77.4° C.; Tc<−20° C.; Δε=−2.9; Δn=0.100; η=17.2 mPa·s; Vth=2.37 V.

Example M16

| | | |
|---|---|---|
| V-HH-3 | (2-1-1) | 32% |
| V-HH-5 | (2-1-1) | 7% |
| 5-HBBH-3 | (2-11-1) | 3% |
| 3-HB(F)BH-3 | (2-12-1) | 3% |
| V-HB(2F,3F)-O2 | (4-1-1) | 11% |
| V-HB(2F,3F)-O4 | (4-1-1) | 3% |
| 3-HH2B(2F,3F)-O2 | (4-7-1) | 3% |
| 3-DhH1OB(2F,3F)-O2 | (4-12-1) | 5% |
| 3-HBB(2F,3F)-O2 | (4-13-1) | 8% |
| 4-HBB(2F,3F)-O2 | (4-13-1) | 4% |
| 5-HBB(2F,3F)-O2 | (4-13-1) | 6% |
| 3-HEB(2F,3F)B(2F,3F)-O4 | (4-15-1) | 3% |
| 3-HHB(2F,3CL)-O2 | (4-16-1) | 3% |
| 5-HHB(2F,3CL)-O2 | (4-16-1) | 3% |
| 3-HBB(2F,3CL)-O2 | (4-17-1) | 3% |
| V-HBB(2F,3CL)-O2 | (4-17-1) | 3% |

Compound (1-1-1-2) was added to the preceding composition in a proportion of 0.05 wt %.

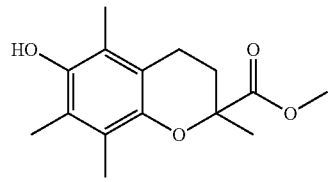

(1-1-1-2)

The characteristics of the composition after the addition were: NI=85.0° C.; Tc<−20° C.; Δε=−3.0; Δn=0.094; η=19.1 mPa·s; Vth=2.49 V.

Example M17

| | | |
|---|---|---|
| V-HH-3 | (2-1-1) | 33% |
| 3-HB-O2 | (2-2-1) | 5% |
| 3-HHB-1 | (2-5-1) | 3% |
| V-HHB-1 | (2-5-1) | 5% |
| 1V-HBB-2 | (2-6-1) | 3% |
| 1-BB(F)B-2V | (2-8-1) | 3% |
| 3-HB(2F,3F)-O2 | (4-1-1) | 8% |
| 3-H1OB(2F,3F)-O2 | (4-3-1) | 5% |
| 3-HHB(2F,3F)-O2 | (4-6-1) | 6% |
| 3-HHB(2F,3F)-1 | (4-6-1) | 5% |
| 1V2-HHB(2F,3F)-O2 | (4-6-1) | 5% |
| 2-BB(2F,3F)B-3 | (4-9-1) | 3% |
| 3-HBB(2F,3F)-O2 | (4-13-1) | 10% |
| 3-H1OCro(7F,8F)-5 | (4-18-1) | 3% |
| 1O1-HBBH-5 | (—) | 3% |

Compound (1-1-1-1) was added to the preceding composition in a proportion of 0.05 wt %.

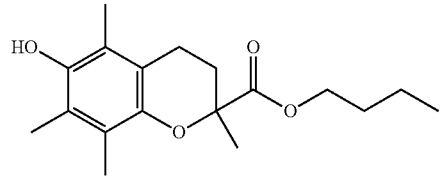

(1-1-1-1)

The characteristics of the composition after the addition were: NI=88.1° C.; Tc<−20° C.; Δε=−2.5; Δn=0.103; η=13.7 mPa·s; Vth=2.57 V.

Example M18

| | | |
|---|---|---|
| V-HH-3 | (2-1-1) | 30% |
| V2-HB-1 | (2-2-1) | 4% |
| 3-HHB-1 | (2-5-1) | 3% |
| 3-HHB-O1 | (2-5-1) | 3% |
| 5-HB(F)HH-V | (2-10-1) | 3% |
| 3-BB(2F,3F)-O2 | (4-4-1) | 10% |
| 2O-BB(2F,3F)-O2 | (4-4-1) | 3% |
| V-HHB(2F,3F)-O2 | (4-6-1) | 10% |
| 2-HH1OB(2F,3F)-O2 | (4-8-1) | 10% |
| 3-HH1OB(2F,3F)-O2 | (4-8-1) | 14% |
| 2-BB(2F,3F)B-3 | (4-9-1) | 5% |
| 3-HDhB(2F,3F)-O2 | (4-11-1) | 5% |

Compound (1-1-1-1) was added to the preceding composition in a proportion of 0.05 wt % and compound (5-7) was added in a proportion of 0.05 wt %.

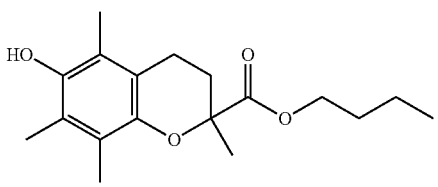
(1-1-1-1)

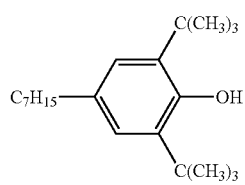
(5-7)

The characteristics of the composition after the addition were: NI=88.2° C.; Tc<−20° C.; Δε=−3.5; Δn=0.099; η=18.5 mPa·s; Vth=2.33 V.

Example M19

| 3-HH-V | (2-1-1) | 21% |
| 3-HB-O2 | (2-2-1) | 3% |
| V-HHB-1 | (2-5-1) | 7% |
| 2-BB(F)B-3 | (2-8-1) | 3% |
| 5-HBBH-3 | (2-11-1) | 5% |
| 5-HB(F)BH-3 | (2-12-1) | 3% |
| 5-HBB(F)B-2 | (2-13-1) | 4% |
| 5-HXB(F,F)-F | (3-1-1) | 5% |
| 3-BBXB(F,F)-F | (3-2-1) | 5% |
| 3-BB(F,F)XB(F,F)-F | (3-3-1) | 9% |
| 3-HHXB(F,F)-F | (3-5-1) | 8% |
| 4-HBB(F,F)XB(F,F)-F | (3-6-1) | 3% |
| 4-BB(F)B(F,F)XB(F,F)-F | (3-10-1) | 8% |
| 5-BB(F)B(F,F)XB(F,F)-F | (3-10-1) | 3% |
| 3-HBB(F,F)-F | (3-14-1) | 6% |
| 3-BB(F)B(F,F)-CF3 | (3-17-2) | 4% |
| 3-HHBB(F,F)-F | (3-18-1) | 3% |

Compound (1-2-1-1) was added to the preceding composition in a proportion of 0.05 wt %.

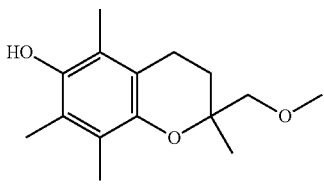
(1-2-1-1)

The characteristics of the composition after the addition were: NI=88.1° C.; Tc<−20° C.; Δε=8.7; Δn=0.117; η=16.5 mPa·s; Vth=1.79 V.

Example M20

| V-HH-3 | (2-1-1) | 31% |
| 3-HB-O2 | (2-2-1) | 5% |
| 3-HHB-1 | (2-5-1) | 3% |
| V-HHB-1 | (2-5-1) | 5% |
| 1V-HBB-2 | (2-6-1) | 3% |
| 1-BB(F)B-2V | (2-8-1) | 3% |
| 3-HB(2F,3F)-O2 | (4-1-1) | 9% |
| 3-H1OB(2F,3F)-O2 | (4-3-1) | 6% |
| 3-HHB(2F,3F)-O2 | (4-6-1) | 6% |
| 3-HHB(2F,3F)-1 | (4-6-1) | 5% |
| 1V2-HHB(2F,3F)-O2 | (4-6-1) | 5% |
| 2-BB(2F,3F)B-3 | (4-9-1) | 3% |
| 3-HBB(2F,3F)-O2 | (4-13-1) | 10% |
| 3-H1OCro(7F,8F)-5 | (4-18-1) | 3% |
| 1O1-HBBH-5 | (—) | 3% |

Compound (1-2-1-1) was added to the preceding composition in a proportion of 0.05 wt %.

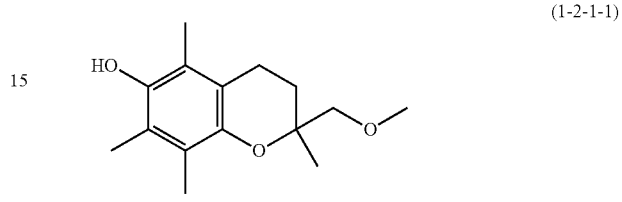
(1-2-1-1)

The characteristics of the composition after the addition were: NI=87.4° C.; Tc<−20° C.; Δε=−2.6; Δn=0.103; η=14.6 mPa·s; Vth=2.50 V.

INDUSTRIAL APPLICABILITY

The liquid crystal composition of the invention satisfies at least one of characteristics such as a high maximum temperature, a low minimum temperature, a small viscosity, a suitable optical anisotropy, a large dielectric anisotropy, a large specific resistance, a large elastic constant, a high stability to UV light and a high stability to heat, or is suitably balanced between at least two of the characteristics. A liquid crystal display device containing this composition can be used for a liquid crystal projector, a liquid crystal television and so forth.

What is claimed is:

1. A liquid crystal composition, having a nematic phase, and including at least one compound selected from compounds represented by formula (1) as an additive having a function of a first antioxidant, and at least one compound selected from compounds represented by formula (2) as a first component:

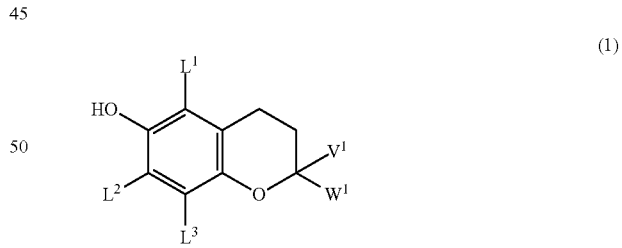
(1)

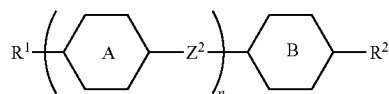
(2)

wherein in formula (1), $L^1$, $L^2$, $L^3$ and $W^1$ are independently hydrogen, halogen, —COOH or alkyl having 1 to 10 carbons, and in the alkyl, at least one —$CH_2$— may be replaced by —O— or —S—, at least one —$CH_2$—$CH_2$— may be replaced by —CH=CH—, and at least one hydrogen may be replaced by halogen; and V¹ is alkyl having 1 to 30 carbons, and in the alkyl, at least one —CH₂— may be replaced by —O—, —CO—, —COO—, —OCO—, —OCOO— or —NH—, at least one —CH₂CH₂— may be replaced by —CH=CH— or —C≡C—, at least one —CH₃ may be replaced by —OH, —SH, —C≡N, —COOH, —NO₂ or —NH₂, and at least one hydrogen may be replaced by halogen, and in formula (2), R¹ and R² are independently alkyl having 1 to 12 carbons, alkoxy having 1 to 12 carbons, alkenyl having 2 to 12 carbons, or alkenyl having 2 to 12 carbons in which at least one hydrogen has been replaced by fluorine;

ring A and ring B are independently 1,4-cyclohexylene, 1,4-phenylene, 2-fluoro-1,4-phenylene or 2,5-difluoro-1,4-phenylene;

Z² is a single bond, ethylene, vinylene in which hydrogen has been replaced by fluorine, methyleneoxy or carbonyloxy; and n is 1, 2 or 3.

2. The liquid crystal composition of claim 1, wherein the additive is at least one compound selected from the group of compounds represented by formula (1-1) to formula (1-5):

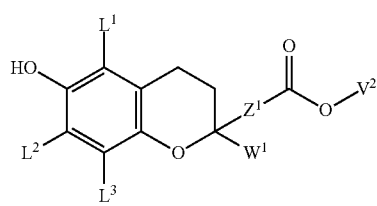

(1-1)

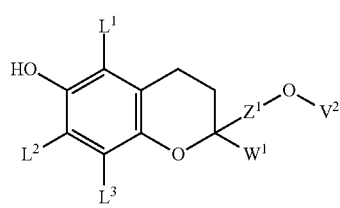

(1-2)

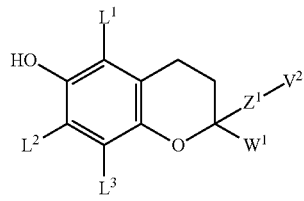

(1-3)

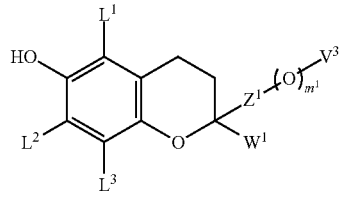

(1-4)

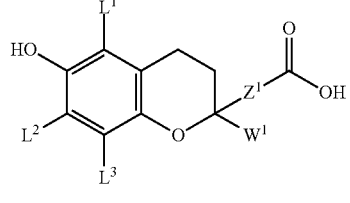

(1-5)

wherein in formula (1-1) to formula (1-5),

L¹, L², L³ and W¹ are independently hydrogen, fluorine, chlorine, —COOH or alkyl having 1 to 10 carbons, and in the alkyl, at least one —CH₂— may be replaced by —O—, at least one —CH₂—CH₂— may be replaced by —CH=CH—, and at least one hydrogen may be replaced by fluorine or chlorine;

V² is alkyl having 1 to 20 carbons or alkenyl having 2 to 20 carbons, and in the alkyl or alkenyl, at least one hydrogen may be replaced by fluorine or chlorine;

V³ is —NO₂ or —NH₂;

Z¹ is alkylene having 1 to 5 carbons or a single bond; and m¹ is 0 or 1.

3. The liquid crystal composition of claim 1, further including at least one second antioxidant that is different from the compound represented by formula (1) of claim 1, as an additive.

4. The liquid crystal composition of claim 1, wherein a proportion of the compound represented by formula (1) of claim 1 is in a range of 0.005 wt % to 3 wt % based on a weight of the liquid crystal composition.

5. The liquid crystal composition of claim 1, wherein the first component is at least one compound selected from the group of compounds represented by formula (2-1) to formula (2-13):

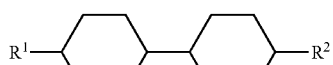

(2-1)

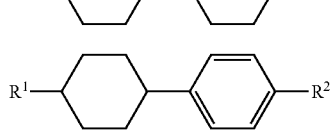

(2-2)

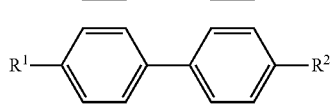

(2-3)

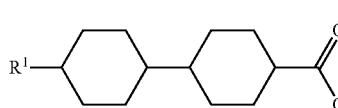

(2-4)

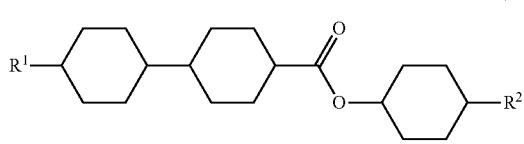

(2-5)

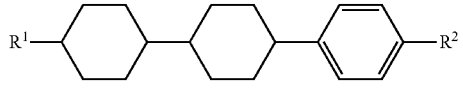

(2-6)

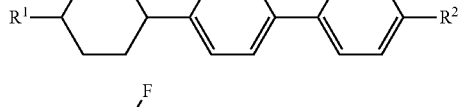

(2-7)

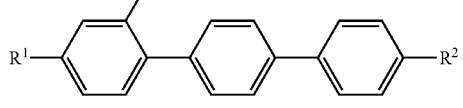

(2-8)

-continued

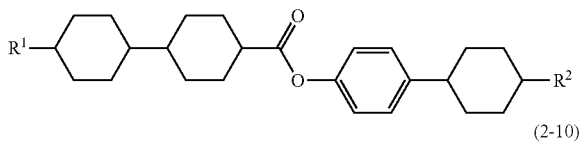
(2-9)

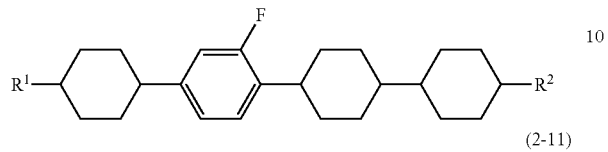
(2-10)

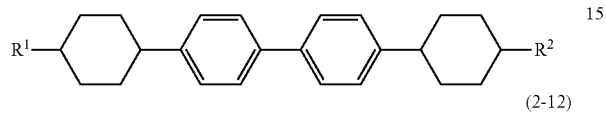
(2-11)

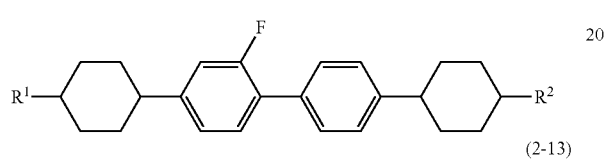
(2-12)

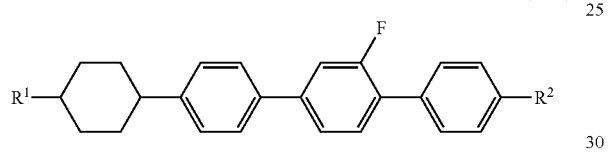
(2-13)

wherein in formula (2-1) to formula (2-13), $R^1$ and $R^2$ are independently alkyl having 1 to 12 carbons, alkoxy having 1 to 12 carbons, alkenyl having 2 to 12 carbons, or alkenyl having 2 to 12 carbons in which at least one hydrogen has been replaced by fluorine.

6. The liquid crystal composition of claim 1, wherein a proportion of the first component is in a range of 10 wt % to 90 wt % based on a weight of the liquid crystal composition.

7. The liquid crystal composition of claim 1, further including at least one compound selected from the group of compounds represented by formula (3) as a second component:

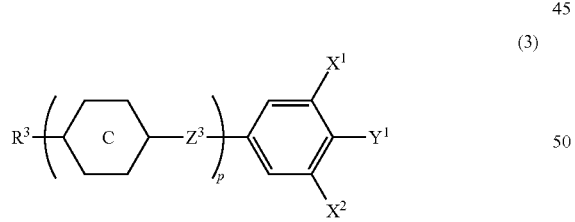
(3)

wherein in formula (3),
$R^3$ is alkyl having 1 to 12 carbons, alkoxy having 1 to 12 carbons, or alkenyl having 2 to 12 carbons;
ring C is 1,4-cyclohexylene, 1,4-phenylene, 2-fluoro-1,4-phenylene, 2,6-difluoro-1,4-phenylene, pyrimidine-2,5-diyl, 1,3-dioxane-2,5-diyl or tetrahydropyran-2,5-diyl;
$X^1$ and $X^2$ are independently hydrogen or fluorine;
$Y^1$ is fluorine, chlorine, trifluoromethyl or trifluoromethoxy;
$Z^3$ is a single bond, ethylene, carbonyloxy or difluoromethyleneoxy; and
p is 1, 2 or 3.

8. The liquid crystal composition of claim 7, wherein the second component is at least one compound selected from the group of compounds represented by formula (3-1) to formula (3-18):

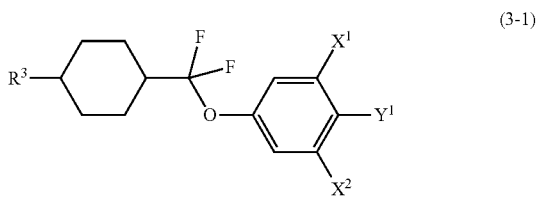
(3-1)

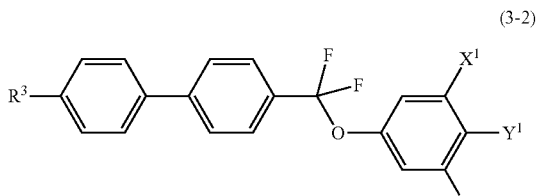
(3-2)

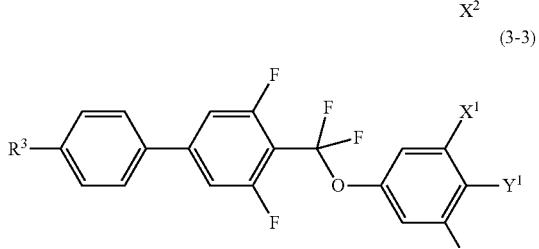
(3-3)

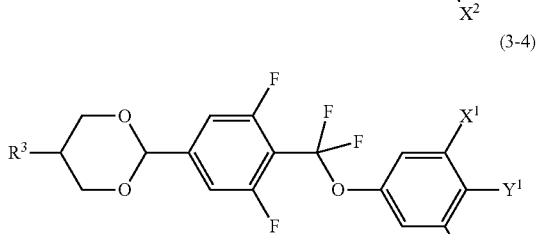
(3-4)

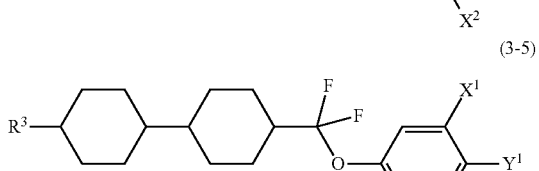
(3-5)

(3-6)

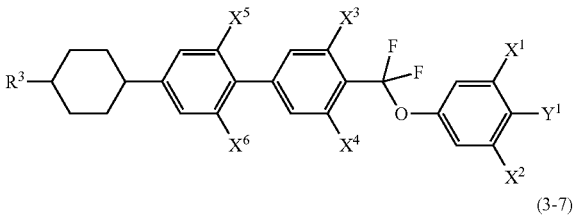
(3-6)

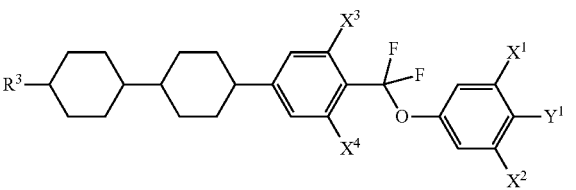
(3-7)

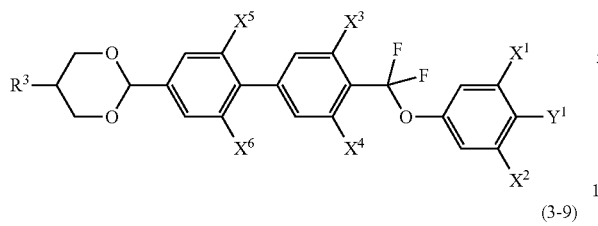
(3-8)

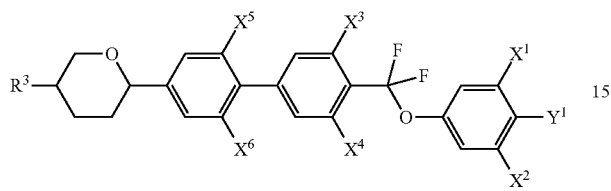
(3-9)

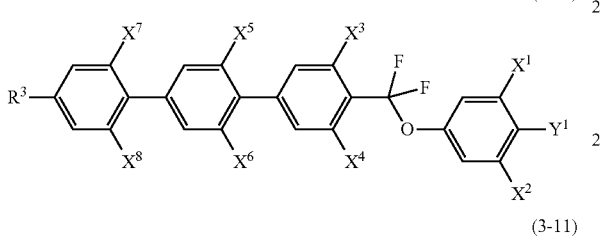
(3-10)

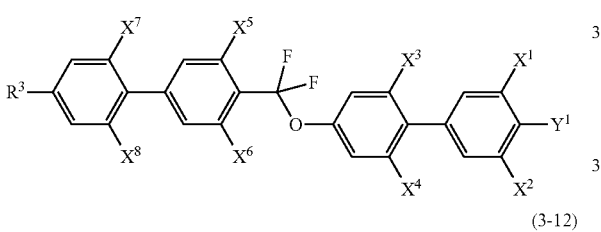
(3-11)

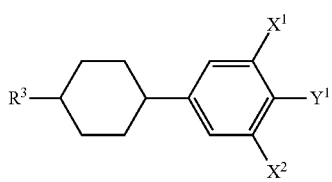
(3-12)

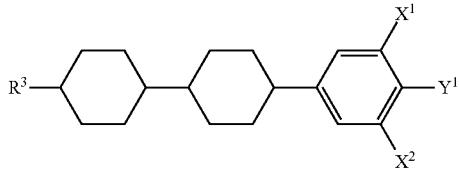
(3-13)

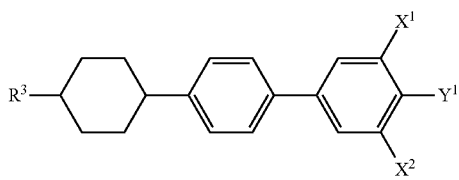
(3-14)

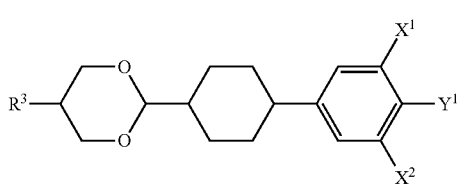
(3-15)

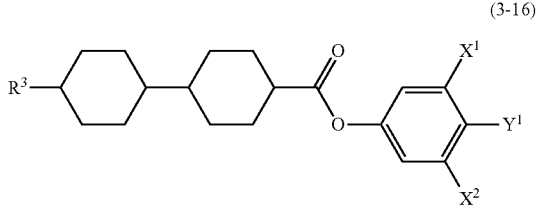
(3-16)

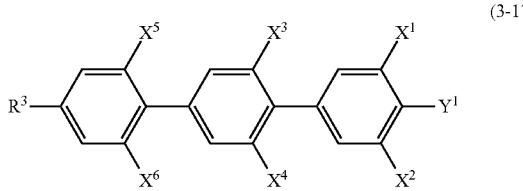
(3-17)

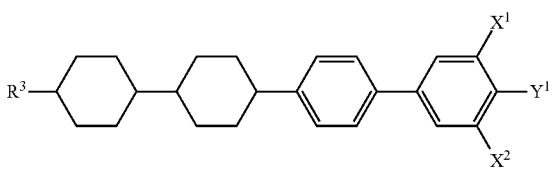
(3-18)

wherein in formula (3-1) to formula (3-18), $R^3$ is alkyl having 1 to 12 carbons, alkoxy having 1 to 12 carbons, or alkenyl having 2 to 12 carbons;

$X^1$, $X^2$, $X^3$, $X^4$, $X^5$, $X^6$, $X^7$ and $X^8$ are independently hydrogen or fluorine; and $Y^1$ is fluorine, chlorine, trifluoromethyl or trifluoromethoxy.

9. The liquid crystal composition of claim 7, wherein a proportion of the second component is in a range of 10 wt % to 90 wt % based on a weight of the liquid crystal composition.

10. The liquid crystal composition of claim 1, further including at least one compound selected from compounds represented by formula (4) as a third component:

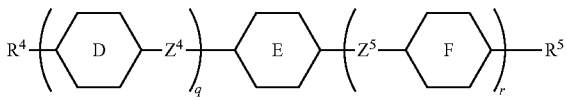
(4)

in formula (4), $R^4$ and $R^5$ are independently alkyl having 1 to 12 carbons, alkoxy having 1 to 12 carbons, alkenyl having 2 to 12 carbons, or alkenyl having 2 to 12 carbons in which at least one hydrogen has been replaced by fluorine;

ring D and ring F are independently 1,4-cyclohexylene, 1,4-phenylene, 1,4-phenylene in which at least one hydrogen has been replaced by fluorine or chlorine, or tetrahydropyran-2,5-diyl;

ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl;

$Z^4$ and $Z^5$ are independently a single bond, ethylene, methyleneoxy or carbonyloxy; and q is 1, 2 or 3, r is 0 or 1, and the sum of q and r is 1, 2 or 3.

11. The liquid crystal composition of claim 10, wherein the third component is at least one compound selected from the group of compounds represented by formula (4-1) to formula (4-19):

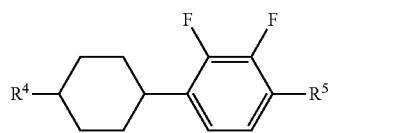
(4-1)

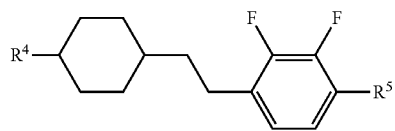
(4-2)

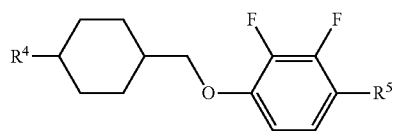
(4-3)

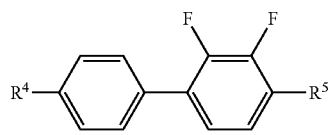
(4-4)

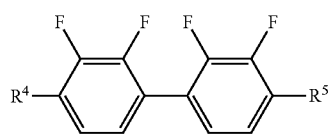
(4-5)

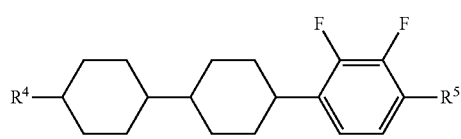
(4-6)

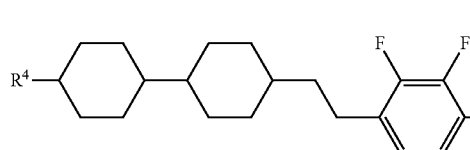
(4-7)

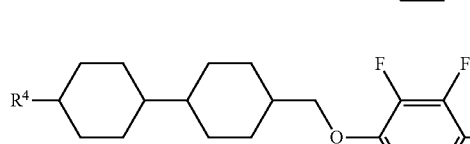
(4-8)

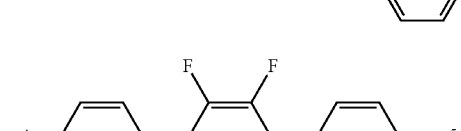
(4-9)

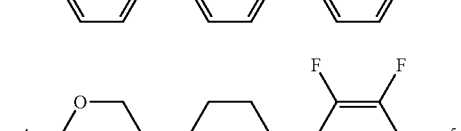
(4-10)

-continued

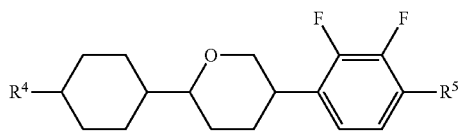
(4-11)

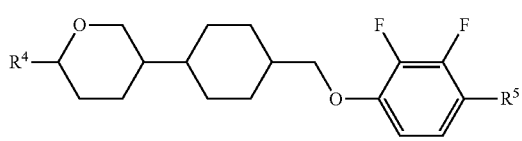
(4-12)

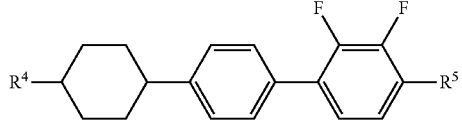
(4-13)

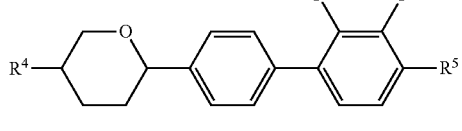
(4-14)

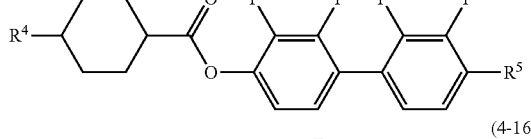
(4-15)

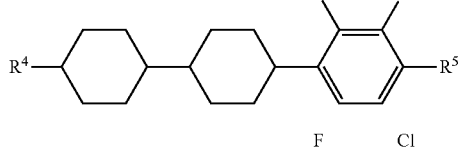
(4-16)

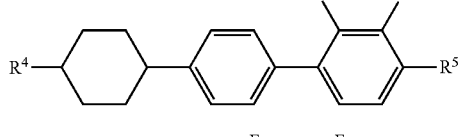
(4-17)

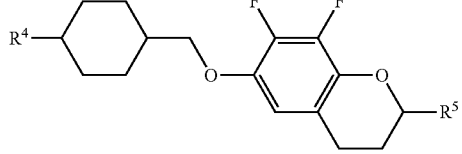
(4-18)

(4-19)

wherein in formula (4-1) to formula (4-19), $R^4$ and $R^5$ are independently alkyl having 1 to 12 carbons, alkoxy having 1 to 12 carbons, alkenyl having 2 to 12 carbons, or alkenyl having 2 to 12 carbons in which at least one hydrogen has been replaced by fluorine.

12. The liquid crystal composition of claim 10, wherein a proportion of the third component is in a range of 10 wt % to 90 wt % based on a weight of the liquid crystal composition.

13. The liquid crystal composition of claim 1, wherein a maximum temperature of a nematic phase is 70° C. or higher, and an optical anisotropy measured at 25° C. at a wavelength of 589 nanometers is 0.07 or more.

14. A liquid crystal display device containing the liquid crystal composition of claim 1.

15. The liquid crystal composition of claim 3, wherein the at least one second antioxidant is at least one compound selected from the group of compounds represented by formula (5):

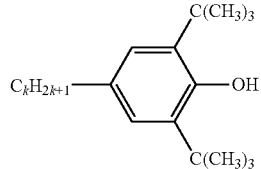

(5)

wherein k is an integer from 1 to 9.

* * * * *